United States Patent
Cutler et al.

(10) Patent No.: US 8,346,646 B2
(45) Date of Patent: Jan. 1, 2013

(54) FINANCIAL MARKET REPLICATOR AND SIMULATOR

(75) Inventors: Stephen Cutler, Fort Myers, FL (US); William MacKenzie, III, Golden, CO (US); Evan Karl Cutler, Girdwood, AK (US); Steven Davis, Delray Beach, FL (US)

(73) Assignee: Advanced Intellectual Property Group, LLC, Fort Myers, FL (US)

( * ) Notice: Subject to any disclaimer, the term of this patent is extended or adjusted under 35 U.S.C. 154(b) by 362 days.

(21) Appl. No.: 12/592,291

(22) Filed: Nov. 20, 2009

(65) Prior Publication Data
US 2010/0138360 A1    Jun. 3, 2010

Related U.S. Application Data

(60) Provisional application No. 61/116,347, filed on Nov. 20, 2008.

(51) Int. Cl.
*G06Q 40/00* (2012.01)
(52) U.S. Cl. ........... 705/36; 705/7.29; 705/36 R; 705/37
(58) Field of Classification Search .................. None
See application file for complete search history.

(56) References Cited

U.S. PATENT DOCUMENTS

| | | | |
|---|---|---|---|
| 7,610,240 B2 * | 10/2009 | Mintz et al. | 705/37 |
| 7,672,895 B2 * | 3/2010 | Mintz et al. | 705/37 |
| 7,774,257 B2 * | 8/2010 | Maggioncalda et al. | 705/36 R |
| 7,958,043 B2 * | 6/2011 | Driscoll et al. | 705/37 |
| 2004/0064395 A1 * | 4/2004 | Mintz et al. | 705/37 |
| 2004/0254876 A1 * | 12/2004 | Coval et al. | 705/37 |

(Continued)

FOREIGN PATENT DOCUMENTS
WO    WO 99/22323    *    5/1999

OTHER PUBLICATIONS

Jensen and King, "Frontier: A graphical interface for portfolio optimization in a piecewise linear-quadratic risk framework", IBM Systems Journal, vol. 31, No. 1, 1992, pp. 62-70.*

*Primary Examiner* — Robert Niquette
(74) *Attorney, Agent, or Firm* — Renner, Otto, Boisselle & Sklar, LLP

(57) ABSTRACT

A financial market replicator, simulator, and trainer/annotator (FMRS) intermixes and records data streams of real time financial market data from a variety of sources. The FMRS replays such recorded data to simulate the real time financial market(s) in a manner that represents substantially the entirety of information relating to the financial market(s) such that an observer would have difficulty differentiating between the simulator playback of the data and real time data. A user may employ the playback of the recorded market data stream as a research and training tool for developing and executing trading strategies. For example, a user may input simulated trades of securities to test a trading strategy. The simulator would apply those trades to the recorded data to generate simulated trades and simulated profit and loss results. A user may then determine if the trading strategy would have been successful. In addition, a user may alter the recording and playback parameters to provide various opportunities for studying market activity and/or altering the level of challenge of the simulation. A user may also freeze the simulator playback in order to explore the interactive and collective behaviors of the market's participants and the securities they trade.

154 Claims, 11 Drawing Sheets

U.S. PATENT DOCUMENTS

2006/0259399 A1* 11/2006 Mintz et al. .................. 705/37
2007/0203783 A1*  8/2007 Beltramo ...................... 705/10
2008/0027880 A1*  1/2008 Yu .............................. 705/36 R
2008/0243572 A1* 10/2008 Amos ............................ 705/7
2009/0132335 A1*  5/2009 Pein ............................. 705/10
2010/0042530 A1*  2/2010 Mintz et al. .................. 705/37
2011/0060677 A1*  3/2011 Almeida et al. ............... 705/37

* cited by examiner

FINANCIAL MARKET REPLICATOR AND SIMULATOR

RELATED APPLICATION DATA

The present application claims the benefit of U.S. Provisional Application Ser. No. 61/116,347, filed Nov. 20, 2008, the disclosure of which is herein incorporated by reference in its entirety.

TECHNICAL FIELD

The present invention generally relates to the analysis of financial and securities market activity, and, more particularly, to a system and method of replicating and simulating financial markets using actual financial market data combined with user settings and metadata to enhance market research, analysis, trading strategies, and trading skills.

BACKGROUND OF THE INVENTION

In a securities market, shares of stock in corporations (and options thereon), commodity futures (and options thereon), currencies, bonds and the like are commonly traded at financial market centers or exchanges. Other traded items can include, but are not limited to index tracking funds, mutual funds, derivatives, etc. For simplicity, the following discussion will be primarily in connection with the purchase and sale of corporate stock, but the principles set forth may be applied to any public or private exchange traded item.

Within a market center or exchange, traders buy and sell securities. To maximize the profit taken from the securities market, traders often track and analyze certain information to determine what moment is advantageous to sell or buy a particular security. Traditionally, traders have tracked information derived from the "floor" of exchanges such as the New York Stock Exchange (NYSE) and American Stock Exchange (ASE), electronic exchanges such as the National Association of Securities Dealers (NASDAQ), futures exchanges such as the Chicago Mercantile Exchange, private market maker exchanges, and the like. Each exchange makes available certain data to the public, and certain data to the market makers associated with the exchange, either for free or via a paid subscription service. For example, this data may include the reporting of trades, trade times, trade volumes, bids, asks, bid volumes, ask volumes, and various other transactional information or pre-transactional information, in the form of "Level I", "Level II" and "Level III" information.

The nature of Level I, Level II and Level III information is known in the art. Briefly, Level I information for a particular security typically includes, but may not be limited to, the current trade price (i.e., last trade), the current trade volume, the total volume of shares traded during the trading session, the price to earnings (P/E) ratio, the previous trading day's closing price, the present day's opening price, the high and low to prices for the day and for the previous 52 weeks, the change from the prior closing price, the lowest ask price (inside ask), the highest bid price (inside bid), the earnings per share, the market capitalization, the dividend paid per share, the dividend yield, news items and articles whether textual, audio, or video, and so forth. Also available are records of historical performance, which can be displayed graphically on a trade by trade basis or aggregated over periods of time ranging from fractions of seconds to years. Also available are statistics for an entire exchange, such as total volume of shares traded and statistics for calculated market indices, such as the Dow-Jones Industrial Average ("The DOW"), the NASDAQ Composite, the Standard and Poor's 500 ("S&P 500"), the Russell 2000, sector indices, etc.

Level II information for a particular security typically includes each market maker, each ECN, and each regional exchange having an open (or active) bid or ask, the time when the bid or ask was placed (also referred to respectively as bid time and ask time), the size of the bid or ask (i.e., number of shares, often reported in lots of 100) and the price of the ask or bid.

Level III information for a particular security includes everything that the other two levels do, plus it allows a particular market maker to go into an exchange's system and change his bids and offers and size on the stocks in which he makes a market or places an order.

This information can be transmitted electronically in near real time (i.e., almost simultaneously with actual market activity) to computer workstations or computer servers for traders and/or computerized trading systems to view and analyze. Trading information also may be recorded and accessed subsequently for at least a given period of time, sometimes, depending on the source, going back days, months, or years. Such information commonly is referred to in the art as Electronic Historical Financial Data (EHFD).

The practice of saving EHFD information is well established. EHFD is typically transactional in basis, and contains a record of trades that have occurred over a defined period of time. Each tradable financial security is typically kept in its own separate data file. For example, a separate data file would be kept for Microsoft trades apart from, Home Depot trades. This practice is similarly used for various other types of financial securities, instruments, and indices with separate files for different items that are traded whether a given item be a stock, a bond, or a futures contract, or index.

EHFD is typically saved in files consisting of formatting information and data records. Each record in the file typically contains various fields of information for a specific interval of time. The granularity of the time interval can be as small as a record for every trade. Other typical time granularities for the records are 1 minute, 5 minute, 10 minute, 15 minute, 30 minute, 60 minute, day, week and month. Custom time interval aggregations can also be kept. The record fields are typically security symbol, delivery month, option expiration, date, time, open (first trade), highest, lowest, close (last trade) and trade volume.

Relatedly, financial market data may be run through an Analytics and Charting Software Program (ACSP) for analyzing and displaying market information, and creating analytic data. Analytic data is derived from and used in conjunction with financial data. Analytic data is derived by applying various formulae and algorithms to the types of data as described above. Such analytic data is well known in the art. It is vast in scope, and typically provides for a means for user customization by allowing the user to change the parameter values of the formula and algorithms. Since time is usually of the essence in trading, most analytic data is calculated and updated in real time to reflect the current market. The process of updating of analytics as new financial information arrives is complex. The updating process often requires the use of intermediate variables. Intermediate variables are analytic data themselves, but are typically only interesting in that they are necessary to update other analytic data. Analytic data goes by many names, known within the art, depending upon how it is used: indicator, index, study, system, system indicator, or alert criterion. The common feature of all analytic data is that it is data derived from the raw financial data.

An example of an analytic data is a simple moving average. A specific analytic data point might be the average of the last five (5) trades of shares of Microsoft at 12:37:40 PM on Sept. 18 2009. To compute this data point from a table of trades involves identifying the trades and summing the last 5 trade prices. The sum is an example of an intermediate variable, as are each of the trades in the sum. The average is obtained by dividing the sum by 5. To determine this same average a moment later, after a new trade has occurred, one may subtract the oldest trade from the sum, add the new trade to the sum, and divide the sum by 5. Such a method of obtaining new information, and updating an analytic, possibly using its previous value, and possibly using intermediate variables, is known in the art as an update formulae or update algorithm.

ACSP tools are known in the art and are utilized in connection with the receipt, analysis, and display of real time and/or historical financial market data. An ACSP may derive and display analytics, bid/ask, trade, and price information from the Level I and/or Level II data for one or more securities. Such market information, and analytics may be useful to traders by providing indications of price or other trends for the financial securities.

In addition to market information provided by the exchanges, a variety of news sources also generate information, whether textual, audio, or video, that may be relevant to securities trading. News items such as earnings reports, mergers and acquisitions reports, product press releases, SEC filings and various other newsworthy events may occur for numerous securities on any given day. Such events may be reported in a variety of print, broadcast (e.g. television and radio), Internet, and other media.

Another type of information which traders find useful for communication and training is user experience information. It is not uncommon for traders to gather as clubs, or in forums to discuss their views on the markets, and their trading ideas and experiences. It is also not uncommon for traders to spend significant amount of money for training, advice, both on the markets, and on methods of trading, and various trading tools and resources. The user experience in a typical ACSP is quite configurable, and the outcome of a trading session can be enormously dependent upon how the available resources of the ACSP are initially configured, and then how they are subsequently manipulated by the user during trading. Traders typically wish to avoid, and if they cannot avoid, avoid repeating, a particularly disastrous trading experience. The actual, intended, or mistaken user actions during a trading session can be useful for communication and training. Being able to capture these trading sessions may be of enormous benefit to a trader. Once captured, this user experience information can be edited, recorded, and shared. After-the- fact narrative and active user metadata may also be added. Collectively, user experience data and user metadata greatly broaden the scope of what an ACSP can do and greatly deepen the usefulness of the user experience.

Many traders are interested in short term upward or downward price movements for selected securities, looking for perceived market imbalances, and often executing numerous trades in any given trading day. Because of these market imbalances, sometimes opportunities exist to make a significant profit over a very short time frame. There are many different events that can cause a market imbalance. The following are a few of many possible examples. Some imbalances may exist because a large position must be liquidated quickly causing supply to temporarily exceed demand. Some market imbalances may exist because a news report was erroneous. This can cause ill-informed market participants to mis-value the security. Other market imbalances may exist because of stale information. For example, the current valuation of the security reflects an assumed cost of a competing or complementary product which has changed. A market imbalance may simply occur because the security is only being initially offered and has not had an opportunity to weigh in market sentiment. Some kinds of market imbalances resolve quickly, such as erroneous news. Others may be caused by governmental policies which may continue for years.

Predicting upward and downward price movement, however, is difficult to say the least. To profit from such perceived imbalances, the trader needs to know whether patterns of imbalance repeat and can be profitable. To do so, traders seek to become proficient in both the creation and the execution of a trading strategy which encompass the identification and contingent execution of trades. Since the identification, estimation of profit, and estimate of time-frame are contingent on ones understanding of the underlying market imbalance and on the behavior of the other market participants, traders are continuously looking to develop or modify their trading strategies and trading techniques. Despite the continuous effort to develop new and better trading strategies, there is no known convenient and effective way to test whether any given strategy will be likely to succeed under actual real time market conditions. Of course, a trader may simply start trading in accordance with the strategy to see if it works, but, given the complexities of the markets, which are virtually innumerable, one would do so at great financial risk since each dollar may be lost only once.

Conventionally, one of the primary methods used by traders to test and validate a trading strategy is to "paper trade". Typically a trader would paper trade by using EHFD files with a computer software program designed to back test trading strategies. A trader would run their analysis only on a predetermined market or security, or only on groups of predetermined markets or securities. A trader will create a "dummy" account with dummy cash and dummy credit balances. A dummy account permits a trader to execute simulated trades without using real money. In this manner, after a testing period (which may comprise minutes, hours, days, months, etc.), a trader can determine if he or she is able to identify a pattern, execute the related trades, and determine whether or not the trading strategy made enough money to justify the risks had the simulated trades actually been executed.

Although this testing method can determine whether the trading strategy would have succeeded or failed during the test period, little confidence can be ascribed to the outcome. For example, a trader may not be able to determine what aspects of the strategy led to success or failure, or whether some market factor unusual to the test period affected the efficacy of the strategy. The use of "dummy" accounts, therefore, has proven deficient insofar as a trader may not attain the necessary information to analyze a trading strategy, and to adjust the execution of the strategy as warranted.

Using conventional trading systems, a trader could not effectively develop a benchmark for their trading ideas from which they could practice with the exact same market conditions. Regardless of the results they got, since they were using EHFD files, one at a time, a trader could never develop an understanding of the interactive, collective, cause and effect forces that exist in the real market. The existing state of the art, and methods of looking back at just on EHFD file at a time, does not capture how financial markets actually work.

Because of their dynamic and ever changing nature, financial markets are elusive. They never exactly repeat themselves. A trader has not been able to effectively reproduce and practice his ideas and trading techniques on the exact same conditions and interdependencies across a market. Furthermore, much of trading depends upon the non-automatic action of the trader himself or herself. Where he or she focused, what markets were being examined, what analytics were employed, what heuristic judgments were made, and what actions were taken, all depend in a sensitive way on the user experience. Having an exact record of what the market did is only a part of what happened. The other part is having a record of what the trader did.

There have been previous attempts to capture and replay market activity, but they have proven deficient in providing traders content in a format usable to improve their trading strategies. They have not provided a trader with an observation window into the detailed and collective bidding process that takes place prior to the actual trade taking place. The NASDAQ has created "NASDAQ Market Replay". However, NASDAQ Market Replay is very limited in scope. It allows a user to select a one particular stock registered on the NASDAQ and to select a date and a time span on that date for which to replay market activity. The user is then presented with all of the information that was transmitted by the NASDAQ for that stock only and to replay it.

There have also been other attempts to capture and replay market activity, but these have all been limited in scope to only a few shares at a time. Conventional capture and replay systems have not been able to capture and replay entire markets at one time. Some have captured a limited amount of user experience data such as the analytics applied. Video recordings of actual trading have been made. Prior to this invention, nothing has captured the full user trading experience in a communicable, and persistent way, with the sufficient detail and fidelity needed by a student in the art of trading.

SUMMARY OF THE INVENTION

There is a need in the art for an improved system and method that will allow a trader to practice their trading skills over and over again on a fixed set of real time market data and conditions. Until this invention, a trader has not been able to replicate essentially the exact real time conditions of substantially an entire market. With this invention a trader can now develop, refine, learn, and practice their trading skills. A trader has not been able to freeze the action of an entire market before, but with this invention, through the ability to freeze a market playback, or playback the market at slower than real-time speeds, a trader is now able to investigate, and hopefully discover, the real time interactive and collective effects at work in financial markets using research based upon the interaction of various analytics, prices and market maker activity for multiple securities and/or multiple exchanges as they occur coincident in real market time. The present disclosure describes a financial market replicator and simulator (FMSR) that assists traders to research, develop and test strategies for trading in financial markets, and a related method for the replication and simulation of one or more real time financial markets.

As one knowledgeable in the art understands, actual trading requires a trader to take actions, and that taking these actions requires the trader's time and attention. The art of successful trading requires that a trader develop proficiency in several different action areas, and then bring the skill sets from all of these action areas together in a fluid and integrated manner. The following example of a trading process is not meant to be comprehensive, but is meant to be illustrative of a process for trading.

Some of the actions taken in the trading process require monitoring and decision making by the trader. Other actions relate to the actual mechanics and process for making a trade. The common element of all of the different actions taken by a trader is that they all take the trader's time. These actions include but are not limited to the following. The trader must decide whether the current market conditions are ripe for trading. The trader must decide what category or categories of securities to trade such as stocks, commodities, currencies, bonds, etc. and then within a category, for example financial stocks or Asian bonds, one or more specific securities. The trader also has to decide on the analytics to be applied to each security, either on a security by security basis, globally for all securities, or combinations thereof. The trader then needs to determine what values or changes in the values of the analytics, or price action itself, warrant attention. If those values or prices are reached or exceeded, a trader would normally need to be alerted in some manner by their ASCP program, most of which have some sort of method to alert the trader when pre-defined conditions are met.

Before taking action, however, a prudent trader would want to check the accuracy of the information that triggered the alert. Not every piece of information transmitted by an exchange is accurate. It is perfectly normal to expect incorrect information to be transmitted by the exchanges on a real time basis. Therefore, before deciding to make the trade, a prudent trader would want to check on the accuracy of the data.

Once the accuracy of the data is determined to be reasonable, the trader would typically want to confirm their trading signals. The trader then has to initiate the process of taking the action of placing the trade order. The trader's process may involve calling their broker or colleague to solicit an opinion. The trade order can be placed by voice by calling a broker, which of course, also, takes time. Most traders prefer to place their order electronically, which is typically faster than by voice. Once an initial order is placed, the trader then has to wait to find out whether or not it was filled, and if filled, at what price. Not all orders are automatically filled. Once filled, the trade then has to be monitored to protect against losses, or to capture profits. This may involve increasing or decreasing their position size. This trade monitoring process also takes the trader's time and attention. While a trade is still active and in process, most traders will be looking for one or more other trading opportunities, which will require the trader to do all of the above pre-trade analysis, post trade monitoring, and decision making. It is common for a trader to have several open positions at any one time.

From the above descriptions, it becomes readily apparent that in order to become proficient in trading, a trader needs to be able to practice, develop and refine all of the skill sets required for successful real time trading. Using conventional trading approaches, the problem that has generally precluded traders from practicing and developing these skills is the elusive nature of financial markets. From day to day, nothing is exactly the same in the markets. Conditions, although they might appear similar, are never the same. A trader could never be sure that the decision and action matrix made from one market session would work in another market session.

Good research in any field of endeavor requires identifying and investigating relevant variables. If variables are always changing, it is impossible to establish a baseline from which understandings can be developed and determinations can be made with a degree of confidence. Without a baseline point of reference, one cannot know which variable is more important.

The present invention allows a trader to practice his or her analytical and trading techniques over and over again, replicating substantially the exact same real time market conditions, setup and user experience through their ACSP. A trader can then, in a scientific way, by using their ACSP change one analytic variable at a time, look for one interrelationship at a time, and see how it affects their decision making matrix.

Through careful scrutiny of the markets at reduced speed, and with the ability to freeze playback, one can attempt to uncover these interrelationships and know when to apply, withhold, or discard various trading strategies. A trader can continue to practice on substantially the exact same market conditions as many times as they need to until they feel they have developed an understanding of the interrelations of those market conditions, have refined their selection of which analytics to use, and have determined which alert values to use for the analytics for trading decisions. Once traders feel they have mastered one market session, they can then test the viability of those ideas on other market sessions. They can continue to do this until they develop the confidence to trade successfully in a variety of different market conditions.

As seen from the above illustrative description of a trading process, the conventional back-testing methods heretofore available to traders are inadequate. They fail in realistically replicating a market as it dynamically unfolds. More importantly, they fail in allowing a trader to practice on, and replicate the human decision making and physical actions required for successful trading.

The Financial Market Replicator and Simulator (FMRS) records at least one real time incoming data stream for financial markets in a manner that represents substantially the entirety of information relating to the one or more financial markets. The incoming data stream(s) may be information transmitted from at least one exchange, may include information from a plurality of exchanges, and may include information from at least one news source. The information transmitted from the at least one exchange may include Level I, Level II and Level III information for a plurality of securities. The FMRS may intermix the real time data from one or more exchanges and one or more news sources, into a combined market data stream.

There is substantially no inherent limit on the number of separate data streams that may be intermixed by the FMRS. The FMRS may intermix, combine, and record financial market information from essentially all of the electronically distributed markets in the world to enable the creation of full or partial global market recordings. These global market recordings can cover any periods of time of market activity, and keep track of all simultaneous global trading. In one embodiment, a market recording would cover a 24 hour period starting at midnight Greenwich Time. Other length recordings may be made, and they may be referenced to any other world time zone. Also, the global recordings can be limited to specific types of securities only, such as stocks, futures, foreign exchange, options, etc. They can also combine any or all of the different types of securities into a market recording.

There are many potential benefits that may accrue to a trader from the playback of these partial or full global market recordings. Using the features of the FMRS and/or ACSP, as fully described elsewhere in this application, would enable a trader, for one or more specific securities, to investigate, for example, what was happening in the Japanese, British and US stock exchanges at the same instant in time. This invention, for the first time, would give a trader the opportunity to research and discover hitherto unknown relationships between markets worldwide. Among other things, the trader could monitor and study cash flows for securities between one or more exchanges, or cash flows between different markets. It could allow for research into both the transactional and market maker activities internationally.

The simulator plays back the recorded market data stream through the ACSP, replicating the financial markets with a substantial degree of realism. In addition, during playback, full functionality of an ACSP may be retained so the trader may be distinctively alerted to the results of statistical analysis on live market data while working within a simulation.

A user may employ the playback of the recorded market data stream as a research and training tool for developing and testing trading strategies. During playback, for example, a user may open multiple analytic windows for one or more securities, each containing charts, Level II windows, "time, sales and bid/ask quote windows", quote windows, position trackers, etc. The number of windows a user can open is limited only by the memory and processing power of the user's computer system. As long as the security is contained within the recorded data stream, one or more of any of the above analytic windows can be opened for a security. By recording the data stream in its entirety a trader is not handicapped by his/her selection of focus at the time the recording was made, nor by not having pre-planned to study certain securities in advance.

As is well known in the art, users typically have their ACSP set up with several different windows simultaneously opened. Some windows may be minimized, some fully or partially opened, some layered one on top of the other, etc. Although a user may be subscribed to a data feed with 100, 250, 1,000, or even more securities, as a practical matter, because of the physical limitations of the computer display(s), the user is typically limited to having just a few of the windows visible for reviewing analytics and charts at any given time. Regardless of how large, or how many computer displays a user has, even if it were theoretically possible to have a window open for each security, it is impossible for a user to focus their eyes on and mentally track all that data simultaneously. Accordingly, users tend to only have as many windows open as they can actually see and mentally track.

Accordingly, with the FMRS running in simulation mode, the user is not limited to displaying information only for those securities that were being displayed in open windows in the ACSP during the recording. No matter how many securities a user has in their data feeds, all of the data for each security is recorded by the FMRS.

Based upon the information presented during playback, a user, for example, may input simulated trades of securities to test a trading strategy. Because the best available price to buy (the bid) and to sell (the ask) always differ, actual trading involves receiving a trade price which is almost always a little worse for the retail trader. In the industry, this is called slippage or bid-ask spread. These systematic losses often eclipse the net result of trading. To know if a trading strategy is worthwhile, it is then necessary to estimate the slippage and deduct it from hypothetical simulated profit and losses. This is done by comparing a simulated trade order against the Level II market maker bid/ask data. Although this is only an estimate, for research purposes to determine trading profitability, a trader may use the best market maker bid/ask prices, and the quoted volumes, to be the trade fill. If the quoted volume is inadequate, additional market maker quotes are available to be included. Since the FMRS records Level II market maker bid/ask data, a trader can get a realistic expectation of what the actual trade fill prices and associated volumes might be. Without correlating a simulated trade against the actual bid/ask prices and volumes existing at the moment of the trade, it is quite possible to get false and misleading simulated trading results. The simulator would apply the recorded data to those trades to generate simulated results for the trades. A user may then determine if the trading strategy would have been successful.

In addition to testing for simulation profitability, a trader needs to test for other things. As traders run and re-run simulations, they will likely find there were times when they did not execute the trading action points correctly, and they will make refinements to alerts, indicator selection, inter-market relationships, etc. These things need to be validated and rehearsed before trading in the real-time market. The trader can validate and rehearse all of the above by using the playback features of the FMRS. A trader may alter the simulator playback by pausing, rewinding, fast-forwarding, adjusting the speed of the playback, and the like. Thus, a novice trader may pause or slow down the simulator playback to study the market data moment by moment, while an experienced trader may speed up the simulator playback to see if things are unfolding as they had expect, or simply for a more challenging experience. Also, the user may "re-run" the simulation using different trades, and may attempt to identify market factors or peculiarities that occurred during the simulation that affected the outcomes.

A user may redo a simulation to test different trading strategies for a given period of the market. For example, if a particular trading day presented high volatility and otherwise challenging market conditions, a user could "replay" the day over and over to test various strategies. Once a trader has practiced on a particular market session, to validate the efficacy of their techniques, he/she can then take the lessons learned and practice on different market sessions. To be successful, traders need to develop trading techniques that work across different market conditions.

In one embodiment, the recorded real time market data may be transferred to conventional storage media (CDs, DVDs, Blue-Rays, flash drives, etc.) and distributed to multiple users so that each user can test strategies for a common period of the market. The recorded real time market data stream also may be downloaded or distributed to multiple users via a network connection, such as over the Internet.

An exemplary use of the FMRS is as an instructional, training, and mentoring tool. Since, the FMRS allows users to run and rerun a replicated market as many times as they choose, professional traders, trainers and brokers, which we will hereafter refer to collectively as instructors, can develop lessons for other students of the art. To replicate a market experience, the FMRS allows a user, or instructor, to insert, edit, delete and record time stamped metadata. The metadata can be in the form of notes, voice narration, mouse movements, etc. It is also envisioned that metadata could be any type of media which could be captured and replayed, such as television footage, computer screen video capture footage emails, instant message conversations, web browsing history, etc. Metadata can be captured either during the recording of a real time trading session, or as it is later played back through the market simulator. On subsequent replays a user may change, add or delete, and then save, user generated information to the market recording. Some of the metadata can be classified as active metadata, in that it causes actions to take place during playback, instead of just being narrative or informative in nature. For example, an instructor might narrate that for described reasons the student (trainee) should open a particular information display within the ACSP. The training recording might further have active metadata to determine if the trainee has accomplished the instruction, and if not, might trigger additional narrative metadata and/or could contain active metadata to cause the desired information display to open anyhow. Another example of a training recording might offer expert narration based as the student explores. In these ways, an instructor can not only replay a market recording, but can also develop and add time sequenced instructional materials to an existing market recording. For example, in the course of a normal trading day an instructor may be using the ACSP in real time to follow the market. The instructor may add text notes, voice notes, studies and annotations to charts, and new analytic alerts as the day proceeds. Furthermore, while the trading day unfolds, the instructor may grow interested in a particular security and email a friend or colleague for an opinion. He or she may also initiate an Internet Messaging Chat (IMC) with a few other associates at the firm, where notes and observations on that security, or other market activity, are exchanged throughout the trading day. While reading a comment from an associate in the IM chat about a major change going on in the government that might affect several of the securities in which he is interested, the instructor may open a web browser to do an internet search on government policy being considered or voted on that day. All of these analytic activities are essential to the instructor's trading methodology.

Skills and workflow such as those just described are difficult to teach to students of the art. Professional instructors may not even consciously realize all of the background information they gather and process away from the ASCP. However, collectively, all of this information becomes part of the instructor's window on the market, and can be recorded by the FMRS as they happen by putting the FMRS into learning mode, and then be replayed as part of a simulation or training lesson by putting the FMRS into teaching mode.

As another example, an instructor can use the ACSP in an investigation of a set of securities. He can open charts and other windows for those securities, annotate the charts with analytics and studies, post notes on the screen, add a verbal narration track, and discuss the market as it unfolds. For the purpose of such courses, the instructor can utilize any of the functionality of the FMSR, including Freeze Points, Way Points, slowing down and speeding up the simulation, etc. The user then can play the instructor's lesson which displays the instructor's metadata, or continue the simulation without the instructor's metadata.

Yet another way to use the FMRS in training is for a course instructor to record his or her strategies, analytics, alerts, notes and initiated trades to a certain point of time in the simulation, then create a user waypoint, and save his user changes to the market recording. The instructor can then give the students a period of time to take as a test in class, or to take with them as homework, to analyze the market simulation up to the user waypoint. Students could then analyze the instructor's recording, replicate what the instructor had done so far in that trading session, and continue trading on their own for the rest of the market simulation playback. At the end of the simulation, students can save their work to be given back to the instructor for grading.

The above are just a few examples to illustrate how the FMRS is more than just a historical display system, and more than just a market replicator and simulator. It is also a training tool that goes well beyond anything available before in conventional systems.

In accordance with the above, aspects of the invention include an exemplary method for replicating activity occurring in connection with at least one financial market. The method includes receiving a market data stream with an electronic receiver over a network interface for a predetermined symbol set containing symbols that are traded over the at least one financial market, wherein the predetermined symbol set includes symbols to which a user of the system has a subscription to receive financial market data as the financial market data becomes available, the market data stream includes market activity data items for the symbols in the predetermined symbol set. The method further includes maintaining a time order of time values associated with each data item so that the time order of the data items replicates a time order of market events represented by the data items with respect to that at least one financial market, and recording all of the time-ordered data items from the market data stream onto a computer readable medium so that the recorded data, when played back, represents a playback of the entirety of the market data pertaining to the predetermined symbol set. Another aspect of the invention is an exemplary system for performing the above method.

Another aspect of the invention is another exemplary method for replicating activity occurring in connection with at least one financial market. The method includes receiving a market data stream with an electronic receiver from a data source for a predetermined symbol set containing symbols that are traded over the at least one financial market, wherein the predetermined symbol set includes symbols to which a user of the system has a subscription to receive financial market data as the financial market data becomes available, and the market data stream includes market activity data items for the symbols in the predetermined symbol set. The method further includes maintaining a time order of time values associated with each data item so that the time order of the data items replicates a time order of market events represented by the data items with respect to that at least one financial market, and playing back the time-ordered data items from the market data stream through a financial market analytics and charting user interface so that the playback represents the entirety of the market data pertaining to the predetermined symbol set. Another aspect of the invention is an exemplary system for performing the above method.

DETAILED DESCRIPTION

I. Overview of the FMRS System

Figure 1:
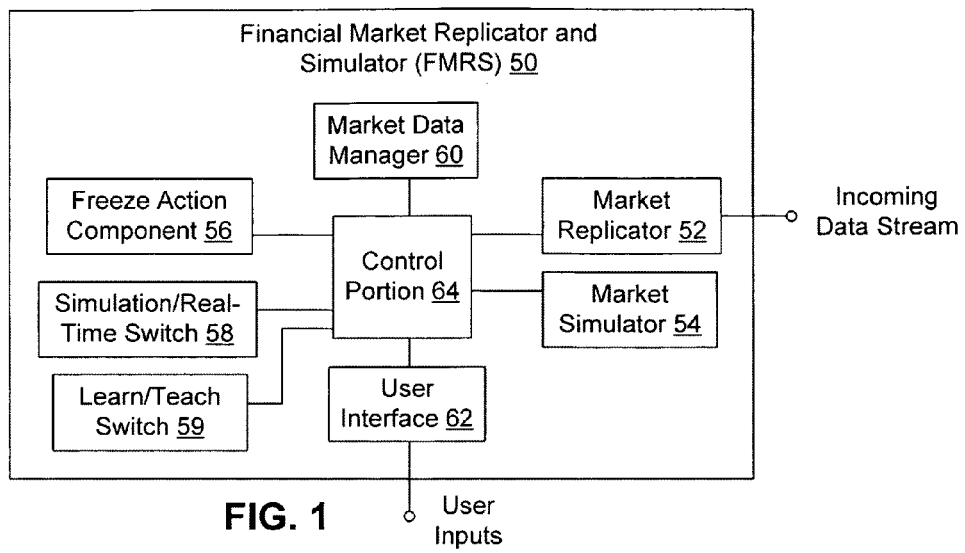
FIG. 1 is a schematic block diagram depicting operative portions of an exemplary financial market replicator and simulator.

A financial market replicator and simulator (FMSR) will now be described with reference to the drawings. In the detailed description which follows, similar components have been given the same reference numerals, regardless of whether they are shown in different embodiments of the FMRS. To illustrate the present invention in a clear and concise manner, the drawings may not necessarily be to scale, and certain features may be shown in a somewhat schematic form.

Referring to FIG. 1, a financial market replicator and simulator (FMSR) 50 provides a system and methods for testing strategies for trading in a financial market. The FMRS may be part of a broader financial market Analytics and Charting Software Program (ACSP) for analyzing market information. In an exemplary embodiment, the FMRS 50 includes a market replicator 52, a market simulator 54, a freeze action component 56, a simulation/real-time switch 58, a learn/teach switch 59, and a market data manager 60. The FMRS 50 further may include a user interface 62 for receiving user inputs, and a control portion 64 for coordinating the functions of the various components.

The market replicator 52 receives, intermixes, manipulates, compresses, and then records one or more incoming electronic financial market data streams. The incoming data streams may include data from at least one exchange. The incoming data streams may alternatively include information from a plurality of exchanges, and/or information from one or more news sources. The data streams, therefore, may include trading activity, bids, asks and orders of the market makers, news items, and other information relating to the one or more financial markets and/or financial exchanges and the securities traded thereon including, but not limited to, Level I, Level II and Level III information. The market replicator 52 may combine and intermix such data into a unitary market data stream, which along with any user settings, notes, layouts, user waypoints and freeze points, etc, then may be recorded onto a storage medium. The amount of the data that can be combined, intermixed and recorded is not explicitly limited, but is limited for the most part only by the bandwidth, processor, memory and storage capacity of the computer system.

The following is a simplified example of how intermixing would be done. Assume that stock data from the NASDAQ is to be combined with futures data from the Chicago Mercantile Exchange (CME). Further assume that the time stamps from the NASDAQ for a few stocks were as follows: MSFT @ 10:13:03, INTC @ 10:13:06 and QQQQ @ 10:13:07. Time stamps from the CME were CZ09 @ 10:13:01, WZ09 @ 10:13:04 and WZ09 @ 10:13:08: The combined and intermixed data feed would display the data in the following order: CZ09 @ 10:13:01, MSFT @ 10:13:03, WZ09 @ 10:13:04, INTC @ 10:13:06, QQQQ @ 10:13:07, and WZ09 @ 10:13:08. In this manner, data from one or more exchanges, and/or one or more data files can be combined to provide a broadened view of market data.

The market simulator 54 decompresses the recorded market data stream and plays back the recorded market data stream to simulate the real time financial market with a high degree of realism. In other words, to simulate the financial market, the incoming data streams are intended to be intermixed while maintaining the time order of the data, recorded, and played back as completely and nearly exact as is practicable such that a user would find it difficult to differentiate between the market simulation and real time market activity.

The freeze action component 56 freezes or stops the playback of the market simulator while retaining full functionality of other portions of the financial analysis software that may continue to run in the background. In particular, the market replicator continues to record the financial market data stream in an unaltered manner even as the playback may be frozen or otherwise altered. The simulation/real-time switch 58 switches between displaying a simulation mode employing the FMSR, and a real-time data mode in which the market data stream is used by the ACSP in real time as the data stream is received. In an exemplary embodiment multiple secondary instances of the market simulator can be running with each instance playing back the same or different market recordings. The main instance of the ACSP can work with either real time or recorded data. The secondary instances can only work with recorded data.

The learn/teach switch 59 provides a way to switch between a teaching mode and a learning mode, which are described in more detail below.

The market data manager 60 manages the various financial market data files for a user. This provides the trader with the opportunity to practice on a large set of historical events and market sessions to improve, validate, and gain greater statistical confidence in developing trading strategies.

Figure 2:
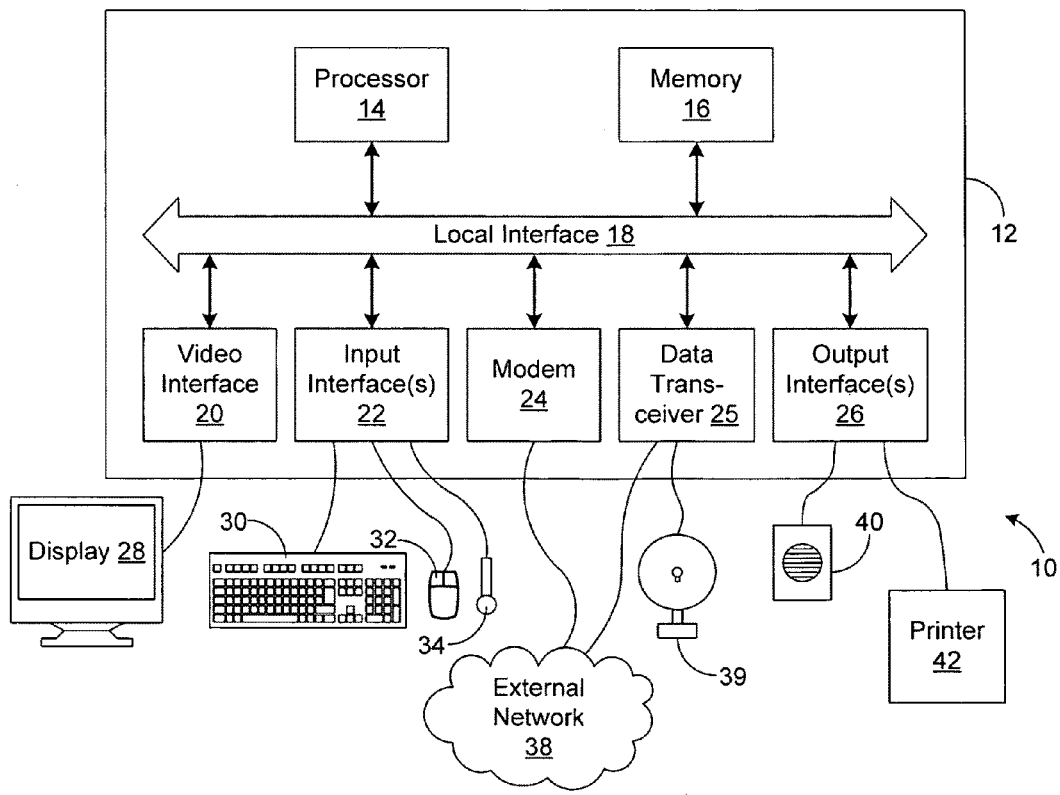
FIG. 2 is a schematic diagram depicting operative portions of an exemplary electronic financial market analysis and trading system.

The FMRS and associated ACSP may be incorporated into and/or executed as a computer software program that is part of an electronic financial market analysis and trading system 10. FIG. 2 is a block diagram of an exemplary system 10. The system 10 includes a computer system 12, which can include multiple computers that can be located remotely from each other. However, in the illustrated embodiment of FIG. 2, the computer system 12 includes a single computer. The computer system 12 has one or more processors 14 for executing instructions, usually in the form of computer code, to carry out a specified logic routine.

The computer system 12 has a memory 16 for storing data, software, logic routine instructions, computer programs, files, operating system instructions, and the like, which may include the FMRS and associated ACSP. The memory 16 can comprise several devices and includes, for example, volatile and non-volatile memory components. Volatile memory components typically do not retain data values upon a loss of power. Non-volatile memory components retain data upon a loss of power. Thus, the memory 16 can include, for example, random access memory (RAM), read only memory (ROM), hard disks, floppy disks, compact disks (including, but not limited to, CD-ROM, DVD-ROM, and CD-RW), tapes, flash memories, and/or other memory components, plus associated drives and players for these memory types. The program described herein can be broken-up so that different parts can be executed by different computers located locally or remotely from each other.

The processor 14 and the memory 16 are coupled to a local interface 18. The local interface 18 can be, for example, a data bus with an accompanying control bus, or a network between a processor and/or processors and/or memory or memories. The computer system 12 may have one or more -video interfaces 20, a number of input interfaces 22, a modem 24 and/or an electronic data receiver or transceiver interface device 25, such as a network interface card (the modem 24, the electronic data receiver 25 and any other device for receiving and/or transmitting data are also referred to herein as an electronic receiver, a receiving means and/or a transceiver), a number of output interfaces 26, each being coupled to the local interface 18.

The system 10 has one or more physical displays 28 coupled to the local interface 18 via the video interface 20. In addition, the system 10 has several input devices including, but not limited to, a keyboard 30, a mouse 32, a microphone 34, a digital camera (not shown) and a scanner (not shown), each being coupled to the local interface 18 via the input interfaces 22. The modem 24 and/or electronic data receiver 25 can be coupled to an external network 38 enabling the computer system 12 to send and receive data signals, voice signals, video signals and the like via the external network 38 as is well known in the art. The external network 38 may be, for example, the Internet, a wide area network (WAN), a local area network (LAN), a direct data link, or other similar network or communications link, including wireless networks. The modem 24 and/or the data receiver 25 can be coupled to receive data from a satellite transceiver 39, co-axial cable, fiber optic cable, a network cable, etc. or over a wireless data link. It is noted that the system 10 can be accessed and used by a remote user via the external network 38. The system 10 can also include output devices coupled to the local interface 18 via the output interfaces 26, such as audio speakers 40, a printer 42, and the like.

The computer system 12 is programmed to display and execute the FMRS and associated ACSP in a graphical user interface (GUI) format. Alternatively, the computer system 12 has logic stored in the memory 16 capable of being executed to display and function as the FMRS software tool. The functionality of the FMRS and ACSP may be embodied using executable code that forms a program (or programs) that is, in turn, stored by a computer readable medium in the form of electronic, optical, magnetic, organic or other memory.

Figure 3:
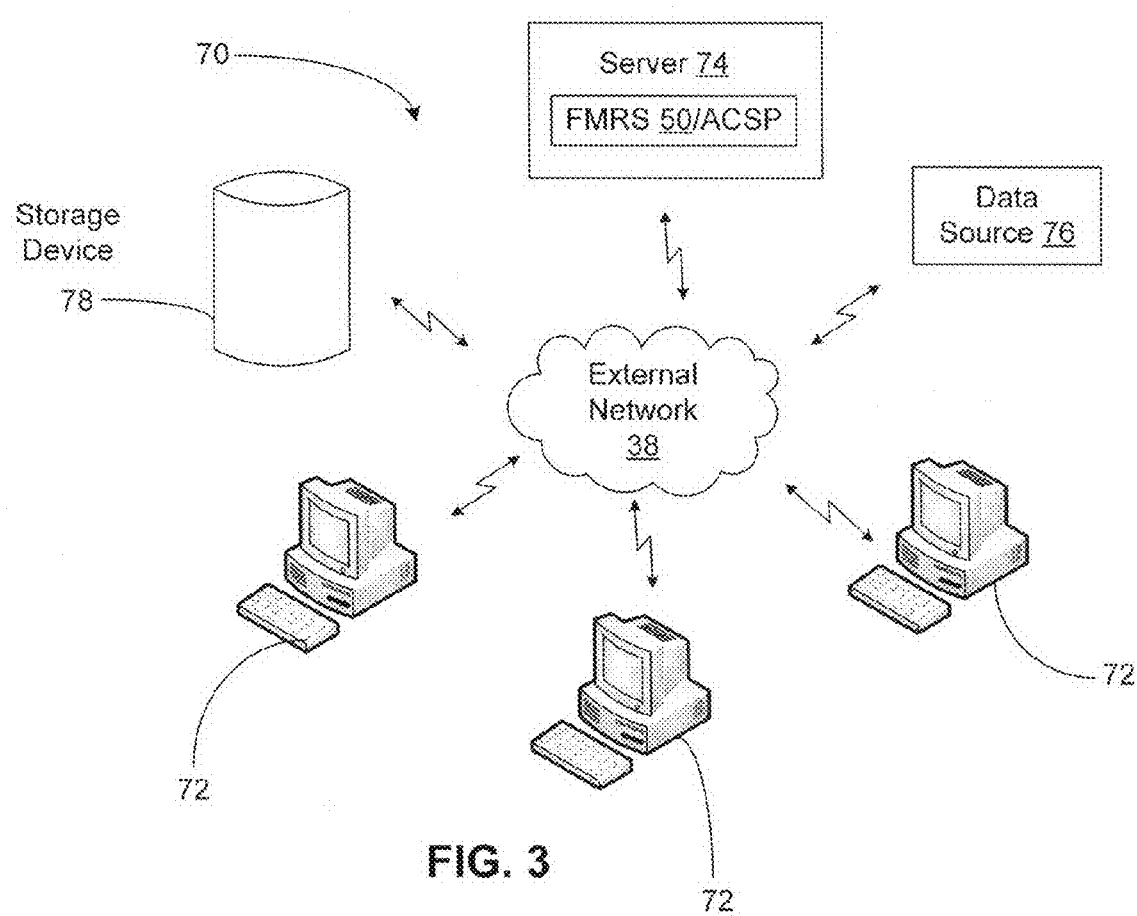
FIG. 3 is a schematic diagram of an exemplary network for executing a financial market replicator and simulator.

FIG. 3 depicts an exemplary network system 70 for executing the FMRS. The network system 70 may comprise at least one client device 72 (which may correspond to a system 10 as described with respect to FIG. 2), which may access an external network 38 as previously referenced. The network system 70 may further include a server or servers 74 that communicate with the participating client devices 72. As will be appreciated, the server 74 may be configured as a typical computer system used to carry out server functions and may include one or more processors configured to execute software containing logical instructions that embody the functions of the server 74 and a memory to store such software. In one embodiment, the server 74 may host the FMRS 50 and/or the associated ACSP for access by the client devices 72. In addition, the network system 70 may include one or more data sources 76, which may provide financial market data as a data stream in real-time for manipulation and processing by the FMSR/ACSP. Moreover, as further described below, the amount of data being generated by the FMRS for a given user may be substantially greater than typically would be stored in a client device 72, which may be a desktop or laptop computer (or comparable electronic device). Accordingly, a network storage device 78 (or storage devices) may be provided for storing the substantial amounts of data received and generated by the FMRS. Market information data streams, stored recorded data, stored trade simulation data, and related information may be distributed to multiple user devices 72 so that each user can test strategies for a common period of the market using the same data. The recorded market data stream, including various sets of both real and simulated trade data, also may be downloaded or distributed to multiple users via the network connections.

Figure 4:
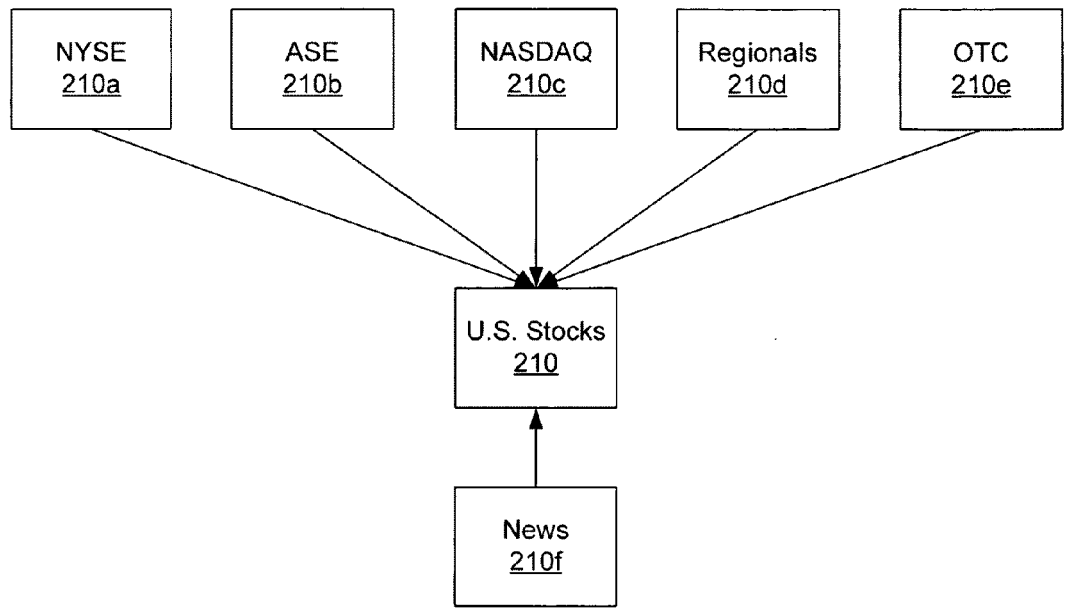
FIG. 4 is a schematic block diagram depicting an exemplary intermixing of the financial market data from stock exchanges within a country.

FIG. 4 depicts an exemplary manner of intermixing the real time data from one or more stock exchanges within a country into a combined market data stream containing one or more of the country's stock exchanges. In this example, United States stock exchanges were used, but the same method could be used to combine the stock market data for any country. For, example, block 210*a* represents the stock data from the New York Stock Exchange (NYSE). Block 210*b* represents the stock data from the American Stock Exchange (ASE). Block 210*c* represents the stock data from the NASDAQ. Block 210*d* represents the intermixed and combined data from the various regional stock exchanges such as the Philadelphia Stock Exchange, the Boston Stock Exchange and other stock exchanges that operate outside the major financial centers. Block 210*e* represents the intermixed and combined data from the various over the counter (OTC) stock exchanges. Block 210*f* represents news for the various stocks traded in the United States. Block 210 represents the intermixed and combined stock market data from all of the exchanges and news represented by blocks 210*a*-210*f*.

Figure 5:
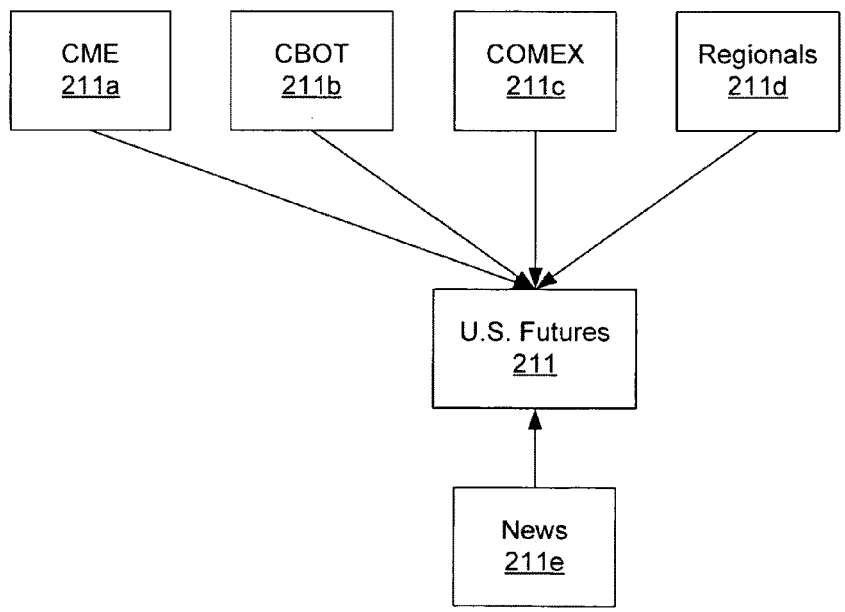
FIG. 5 is a schematic block diagram depicting an exemplary intermixing of the financial market data from futures exchanges within a country.

FIG. 5 depicts an exemplary manner of intermixing the real time data from one or more futures exchanges within a country into a combined market data stream containing one or more of the country's futures exchanges. In this example, United States futures exchanges were used, but the same method could be used to combine the futures market data for any country. For example, block 211*a* represents the data from the Chicago Mercantile Exchange (CME). Block 211*b* represents the data from the Chicago Board of Trade (CBOT). Block 211*c* represents the data from the COMEX which is a division of the New York Mercantile Exchange. Block 211*d* represents the intermixed and combined data from the various regional futures exchanges such as the Kansas City Board of Trade, the Minneapolis Grain Exchange and other futures exchanges that operate outside the major financial centers. Block 211*e* represents news for the various futures traded in the United States. Block 211 represents the intermixed and combined futures market data from all of the exchanges and news represented by blocks 211*a*-211*e*.

Figure 6:
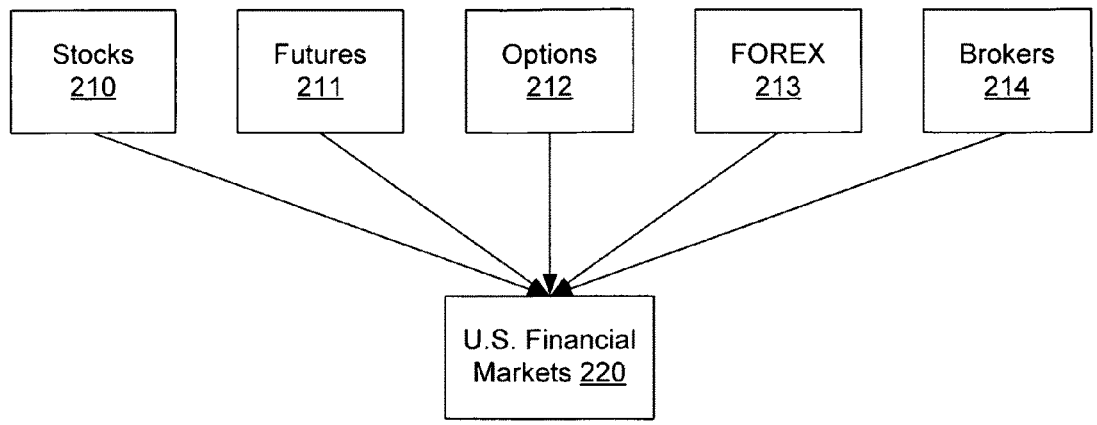
FIG. 6 is a schematic block diagram depicting an exemplary intermixing of the financial market data from financial exchanges, along with the news for securities on those exchanges, within a country.

FIG. 6 depicts an exemplary manner of intermixing the real time data from one or more classes of financial markets within a country into a combined market data stream containing one or more of the country's financial markets. In this example, United States financial markets were used, but the same method could be used to combine the financial market data for any country. The intermixing of data depicted in FIGS. 4 and 5 above are not limited to just stocks or futures, but can be used to intermix and combine any class of financial market data. For example, block 210 represents the data from the United States stock markets from FIG. 4. Block 211 represents the data from the United States futures markets from FIG. 5. As shown in FIG. 6, additional categories of financial data may be intermixed. For example, block 212 represents the data from the United States options markets. Block 213 represents the data from the United States foreign exchange markets (FOREX), and block 214 represents the data from various United States brokers, market makers and banks that deal in FOREX. Block 220 represents the intermixed and combined market data and news from all of the markets and news sources represented by blocks 210-214.

Figure 7:
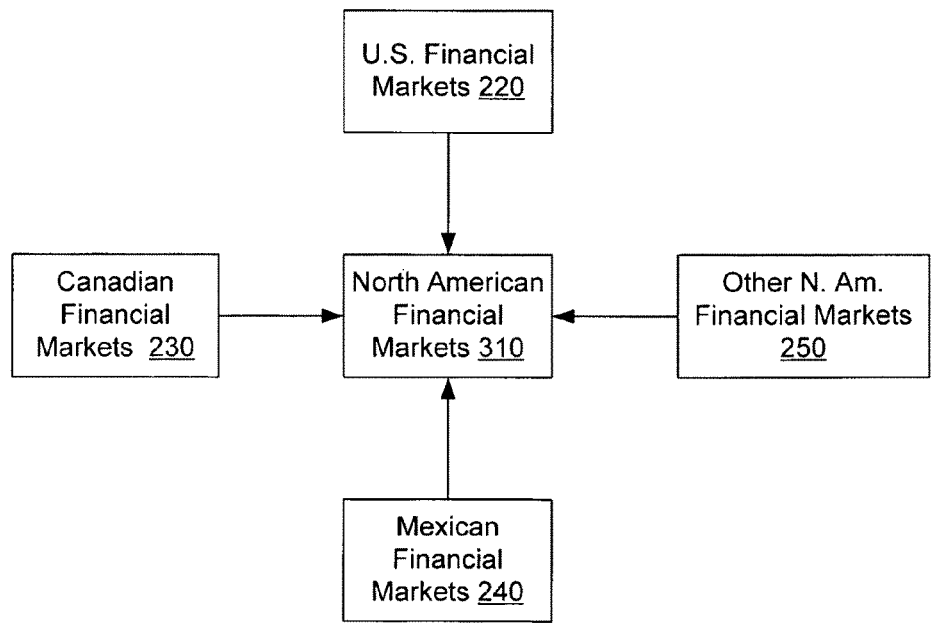
FIG. 7 is a schematic block diagram depicting an exemplary intermixing of the financial market data and news from countries within a continent.

FIG. 7 depicts an exemplary manner of intermixing the real time data and news from one or more countries within a continent into a combined market data stream for the continent. In this example, North American financial markets were used, but the same method could be used to combine the financial market data for any continent. For example, block 220 represents the financial data and news from the United States. FIG. 230 represents the financial data and news from Canada. Block 240 represents the financial data and news from Mexico. Block 250 represents the intermixed and combined data from the other North American Countries. Block 310 represents the intermixed and combined market data and news from all of the countries represented by blocks 220, 230, 240, and 250.

Figure 8:
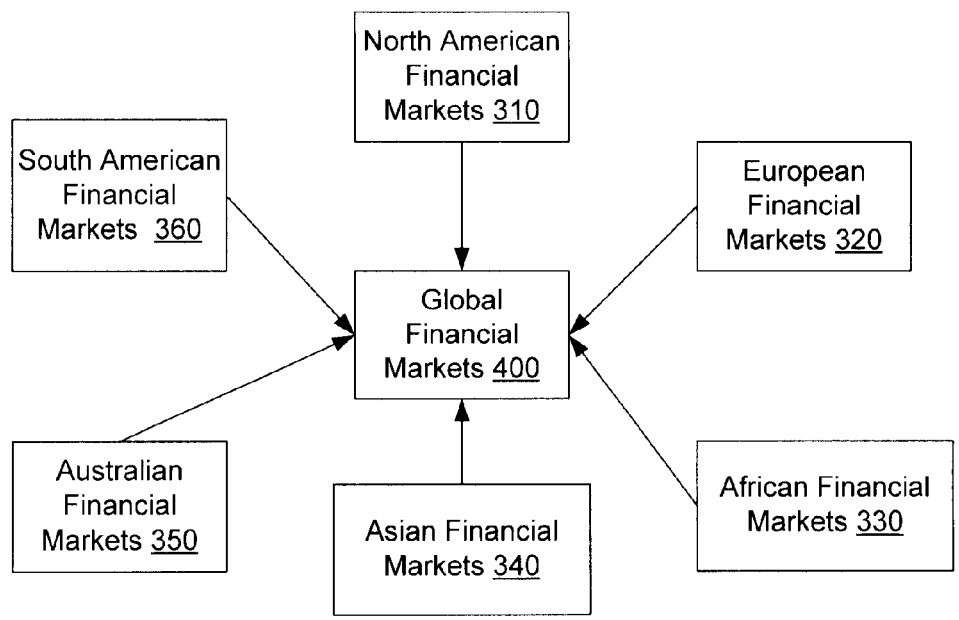
FIG. 8 is a schematic diagram of an exemplary intermixing of financial market data and news from continents around the world.

FIG. 8 depicts an exemplary manner of intermixing the real time data and news from one or more continents into a combined global market data stream. For example, block 310 represents the financial data and news from North America. Block 320 represents the financial data and news from Europe. FIG. 330 represents the financial data and news from Africa. Block 340 represents the intermixed and combined data from Asia. Block 350 represents the intermixed and combined data from Australia. Block 360 represents the intermixed and combined data from South America. Block 400 represents the intermixed and combined market data and news from all of the continents represented by blocks 310, 320, 330, and 340, 350, and 360.

Figure 9:
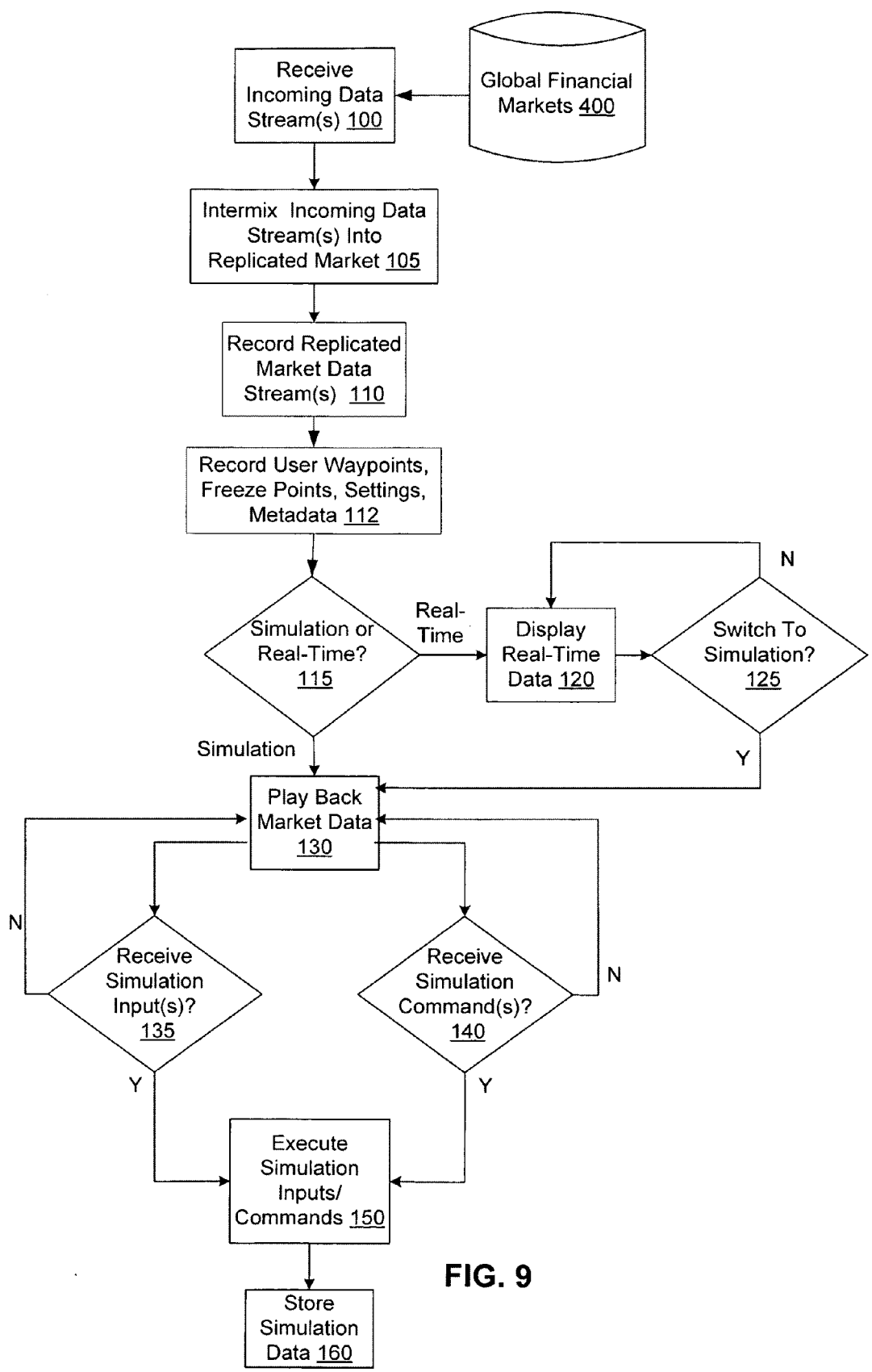
FIG. 9 is a flow chart depicting an exemplary method of replicating a financial market.

FIG. 9 depicts an exemplary method constituting an overview by which a market replication may be generated by the FMRS. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention. It will be appreciated that FIG. 9 represents an overview, and more specific details regarding each aspect of the system are provided below.

The method may begin at step 100, at which the FMRS may receive one or more incoming data streams of financial market data. The incoming data streams may include information from a plurality of exchanges, and may include one or more news sources. In one embodiment, as shown in FIG. 9, the incoming data stream may be the combined global market data 400 of FIG. 8. At step 105, the incoming data streams from these various sources may be intermixed in a manner that maintains the sequential time order of all data received, to generate a combined market data stream. The market data stream may be compressed to conserve storage requirements. At step 110, the FMRS may record the market data stream in a substantially precise representation of the data as received and intermixed. In one embodiment, the user may control the recording of data for later use to playback during a simulation. In another embodiment, a service provider may make recorded data available to a user to run a market simulation. For instance, the service provider may maintain a library of trading sessions from which the user may select. The recorded trading sessions can then be delivered electronically over the internet, on hard copy through the mail or other delivery services, or by any other feasible means.

In another embodiment, the FMRS can create combinations of different markets by intermixing and combining previously recorded sessions from different markets and/or exchanges that cover the same moments in time as each other and combine them into a time ordered mega data stream spanning several markets and exchanges.

At step 112, the FMRS may record user specific information such as user waypoints, user freeze points, user settings and user metadata. The saving of user specific information is a critical part of replicating and simulating previous market experience. The user specific information included in this step is described in detail elsewhere in this application.

At step 115, a determination may be made as to whether the FMRS is set in a simulation or real-time mode. If in the real-time mode, at step 120 the data from the incoming data stream is displayed in real-time as received. If the FMRS is set to simulation mode, the method may proceed to step 130.

Note that the simulation mode may be set initially, or entered by switching from the real-time mode as shown in step 125.

At step 130, once in the simulation mode, the FMRS may play back recorded market data, or a portion thereof, to simulate the financial market, or a portion thereof. The playback is intended to simulate and represent the real time financial market as nearly exact as is practicable. At step 135, the FMRS may receive one or more simulator inputs from a user. For example, a user may open a chart for a security, or other market, run user determined analytics in the chart, set user alerts on the analytics, and based upon the alerts input a simulated trade entry, exit, accumulation, or distribution as part of testing a trading strategy. In addition, at step 140 the FMRS may receive a command input that alters any one or more aspects of the playback of the recorded market data. For example, a user may pause or freeze the simulation. With the market simulator a user may also rewind the market data playback, replay the market data playback, fast forward the playback, select an alternative playback speed either faster or slower than real time speed, start the playback from or skip backward or forward to a different point in the data stream (e.g., jump to a desired point in the data stream, such as a point corresponding to a particular time of day during a recorded trading session or a point corresponding to a user-established or automatically-established waypoint, or corresponding to a particular freeze point, alert, etc.), and other operations. Various playback options are described in more detail below. If the FMRS receives any user simulator inputs or commands, such inputs and commands may be executed at step 150. The FMRS may store the simulation data at step 160 as altered based on the execution of user inputs.

For example, the FMRS may simulate the results of numerous trades entered by the user in accordance with the user's trading strategy. A user may observe the results of the simulated trading activity to recap, evaluate and consider the overall efficacy of the trading strategy. In addition, a user may freeze/pause the simulation at an instant in time for a more detailed consideration of the market or any of its aspects, including charts, studies, analytics, tables, executed trades, news, etc. In addition, a user may compare one set of recorded simulation inputs and their effects with another set. In this way a user can track and compare their relative success with various trading strategies, thus learning which inputs made key differences in results. As stated above, a user may also rewind or fast-forward the playback and simulation so that the user may consider and evaluate the simulation at a particular point in time, and/or speed through a trading session to accelerate the simulation process. Because the user may navigate to and freeze the simulation at a particular point in time, the user may analyze what occurred in detail and thus determine what may have affected the efficacy of the trading strategy. The user may then adjust the trading strategy as warranted. A user may then test the amended strategy against the same portion of the data stream, and/or test the strategy against additional or different data (e.g., market data from a different trading session). A user also may adjust the speed of the market simulator playback to render the simulation slower or faster. Other inputs and commands may be employed as well. In this manner, a user has a variety of options for simulating and evaluating a potential trading strategy.

In connection with the freezing capability referenced above, a user may freeze the market playback at a particular instant in time within the real time or recorded market data stream. The freeze action freezes or stops the playback of the market simulator while retaining full functionality of all other portions of the financial ACSP that may continue to run in the background. For some users, market data that is played back at real time speed may proceed at a rate that renders it difficult for a trader to fully analyze all aspects of the data.

Traders are often interested in intensive periods of market activity. As a result, there are typically many related things taking place simultaneously. The ability to freeze, back-up, and replay at a slower speed can be a significant tool in analyzing market data. This is just as true of live trading as of simulated playback. When testing and training using the market simulator, a user, therefore, may freeze the simulation to explore the various aspects of the market data in a more deliberate manner. Freezing the playback thus permits a user to freely access content within the simulated market at the freeze point time. Among other things, the user is free to experiment with different indicators, parameter values, and related markets. This market freeze feature provides a user with the ability to investigate and study, on a security by security basis, what heretofore were illusive and undiscoverable interrelationships of market action and behavior. Freeze points in the recorded market data may be saved to permit analysis of such data at any time convenient for the user. For example, a user may access the stored data at the instant of time of the freeze point hours, days, weeks, etc. after saving a freeze point so as to permit detailed analysis of the market data in a manner most suitable for the user. The user may also save multiple different freeze points in the recorded market data to permit comparisons of market behavior at different points in time. A freeze point may also be saved in the form of a more inclusive waypoint. If it is saved in this manner, the waypoint may include storing user entered information, including notes, real trades, simulated trades, settings such as the user's open ASCP windows and charts, and so forth.

Freezing the market replay in the market simulator is very different in concept from pausing the playback of a CD or DVD. When a CD or DVD recording is paused, everything is stopped. The functionality of the CD or DVD player is stopped, and there is nowhere to go within the recording at that instant of pause time. There is nothing to explore. One is simply left with a frozen image on the screen that does not change. By contrast, freezing the replay of the market simulator creates a portal in time through which a user can enter in order to explore the market. Although the action of the market playback is stopped, the action of the user within the ACSP is not. Using the functionality of the ACSP, a user can navigate within the market to explore what happened at that instant of time. If the user, for example, is subscribed to only 100 different securities, while the market is frozen the user has the ability to explore substantially every aspect of every security. The user can change images on the charts by changing securities, analytics, time frames, etc. For example, when the user wants to see what a different security looks like in a chart, he simply enters the security's symbol or name, and the chart image would change. Any change that a user makes would be dynamically updated within the ASCP and could be shown on the computer display(s). A user can open new windows, or close open windows. Virtually any function within the ACSP, that is available to the user when the market is in motion, is also available when it is frozen. A user can thus move through a market and examine, in various ways, a vast breadth of information.

In addition, the market replicator may continue to record the financial market data stream in an unaltered manner even as the playback may be frozen or otherwise altered. A user, therefore, may switch between a standard playback and a frozen mode, and vice versa, to permit a full analysis of the market data stream under a variety of playback scenarios. In addition, during playback full functionality of the ACSP is maintained, even when the playback is altered such as by freezing, altering the speed, or otherwise as described above. Essentially every aspect of the ASCP that is available to the user in real time is available to the user in simulation mode regardless of whether the simulation is frozen or playing. For example, the user can open one or more charts, display one or more symbols in each chart, run a variety of different analytics in each chart, change the symbols, etc. At the same time, a user can also open time and sales windows for multiple securities, do simulated trades, and so on. There are substantially no functional limitations to what the ACSP can do in simulation mode as compared to real time mode. Also, under the various playback scenarios, a user may explore Level I and/or Level II information regarding one or more securities, as well as generate and explore analytics information derived by the ACSP from the Level I and/or Level II information for such one or more securities.

Figure 10:
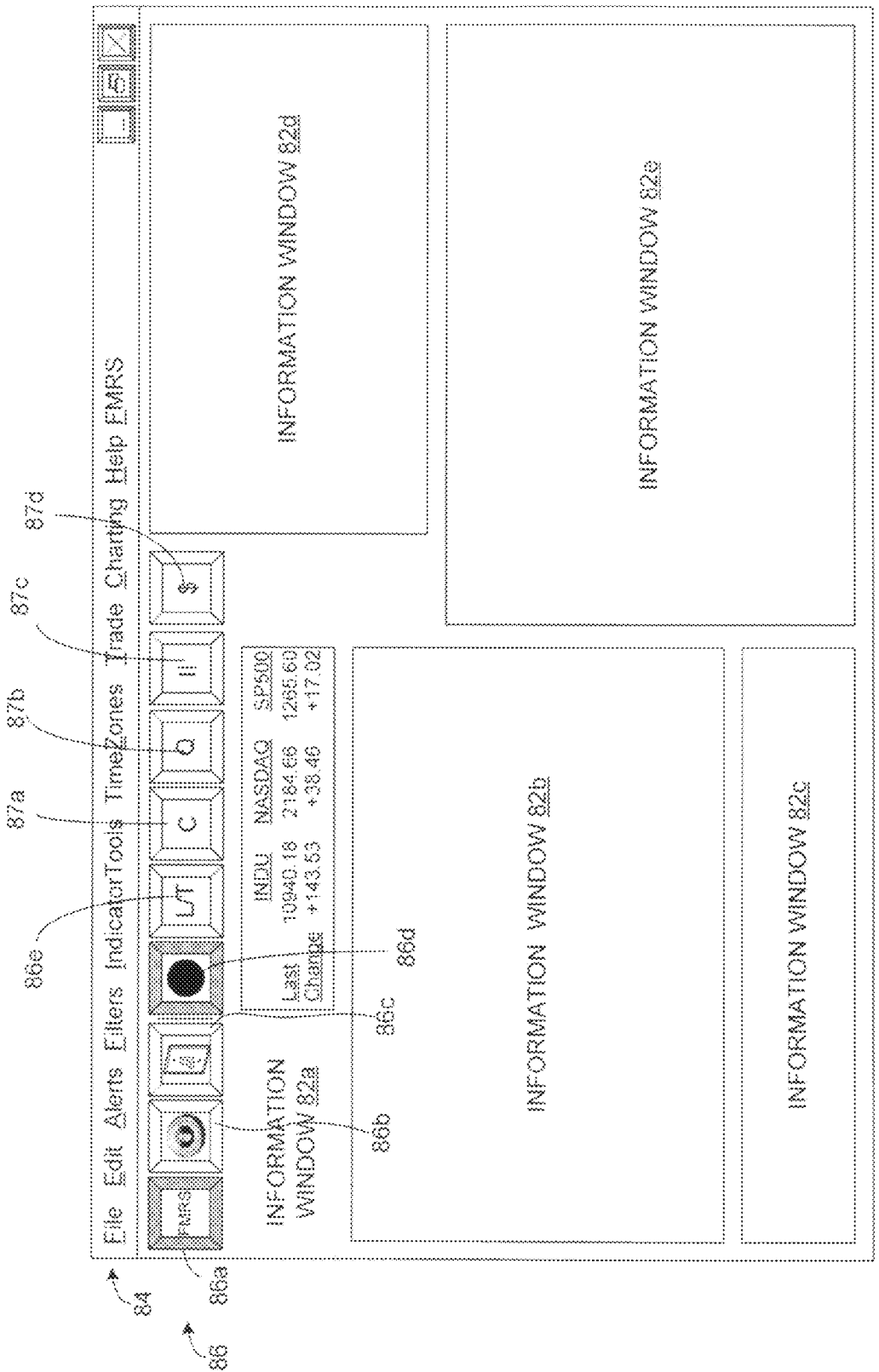
FIG. 10 is a schematic diagram of an exemplary graphical user interface (GUI) for an ACSP.

The FMRS may be integrated into the broader ACSP. FIG. 10 depicts an exemplary graphical user interface (GUI) display screen 80 (or screen shot) generated by the ACSP and displayed on the display 28. The display screen 80 displays information to a user of the ACSP. This information is intended to assist the user in deciding which securities to purchase or sell and when to make those purchases and sales. The display screen 80 includes a number of regions for displaying various sets of information and includes information windows 82a-e. As shown, numerous windows may be open simultaneously. The numbers of windows that can be opened simultaneously are limited only by the capacity of the computer system. For purposes herein, the precise form and content of the windows may vary. The windows, therefore, are indicated generically and may include, but are not limited to, various kinds of information as would be typical of an ACSP. Information that may be displayed in one or more windows may include action items, Level I, Level II, and Level III information displays, analysis and results information, charts, alerts, news, etc. The exemplary display screen 80 includes drop-down menus 84 for allowing the user to select various features and functions of the ACSP.

In another exemplary embodiment, multiple instances of the ACSP can be running at the same time. In one instance of the ACSP, which is referred to herein as the primary instance, the software program can be running and both displaying and recording real time market session data. Another secondary instance of the ACSP can simultaneously be playing back, at a user determined speed, or freezing the action of the data being recorded. Yet another secondary instance of the ACSP can be playing back a market recording from another market session. The number of separate secondary instances of the ACSP that can be running at the same time is limited for the most part only by the capabilities of the computer system on which they are running. The ACSP GUI may include functional toolbar buttons or icons 86 which can be selected by the user by moving a mouse-controlled cursor to the button and pressing a mouse button to select the button displayed on the display screen 28. In addition, keyboard 30 actions, touch screen actions, and/or voice commands can be used to select various functions and control the ACSP. Upon selecting the button, menu item, icon or function (or other command entry mechanism), the ACSP carries out logic to invoke a corresponding action.

The ACSP GUI may include an input button or icon associated with accessing and executing features of the FMRS. For example, selecting the FMRS button 86a of FIG. 10 may be employed for entering the FMRS components to adjust various FMRS options and parameters (described below). As will be understood, market information displayed in the windows 82 is updated dynamically as market events occur.

The rate of dynamic change will directly correspond to the user selected rate of market simulation playback (e.g., actual rate of the corresponding live market, slower than actual rate, faster than actual rate, or jumping in increments of time, such as every five or ten minutes, or jumping forward to a preselected time). To freeze this dynamic updating of displayed information, another input option may be a "market freeze" item 86b to freeze the display of market data and analytics of the ACSP at a point in time selected by the user. The user may then analyze the data at and around the time of the freeze point. The ACSP GUI may also include a simulation/real time switch 86c that permits a user to toggle between a simulation mode (which plays back stored market data or that freezes the use of live market data from a current trading session) and real time mode (which uses live market data from a current trading session). Additional functional buttons or icons are depicted in FIG. 10, which may be appropriate to the ACSP. For example, a button 87a (C) permits a user to open a chart window. Similarly, button 87b (Q) permits a user to open a quote window, button 87c (II) permits a user to open a Level II window, and button 87d ($) permits a user to open a window that keeps track of open trade positions. Pressing one of these buttons may also open additional more specific menus, submenus, or options for the user.

It will be appreciated that the illustrated form and content of the ACSP GUI is is exemplary and may be varied in form and content. In this vein, options may be selected from the ACSP GUI using icons, drop-down menus, toolbar buttons, menu trees, or other means for inputting a selection into a computer system.

More detailed features of the various FMRS components will now be described.

II. Description of FMRS Components

A. FMRS GUI

Figure 11:
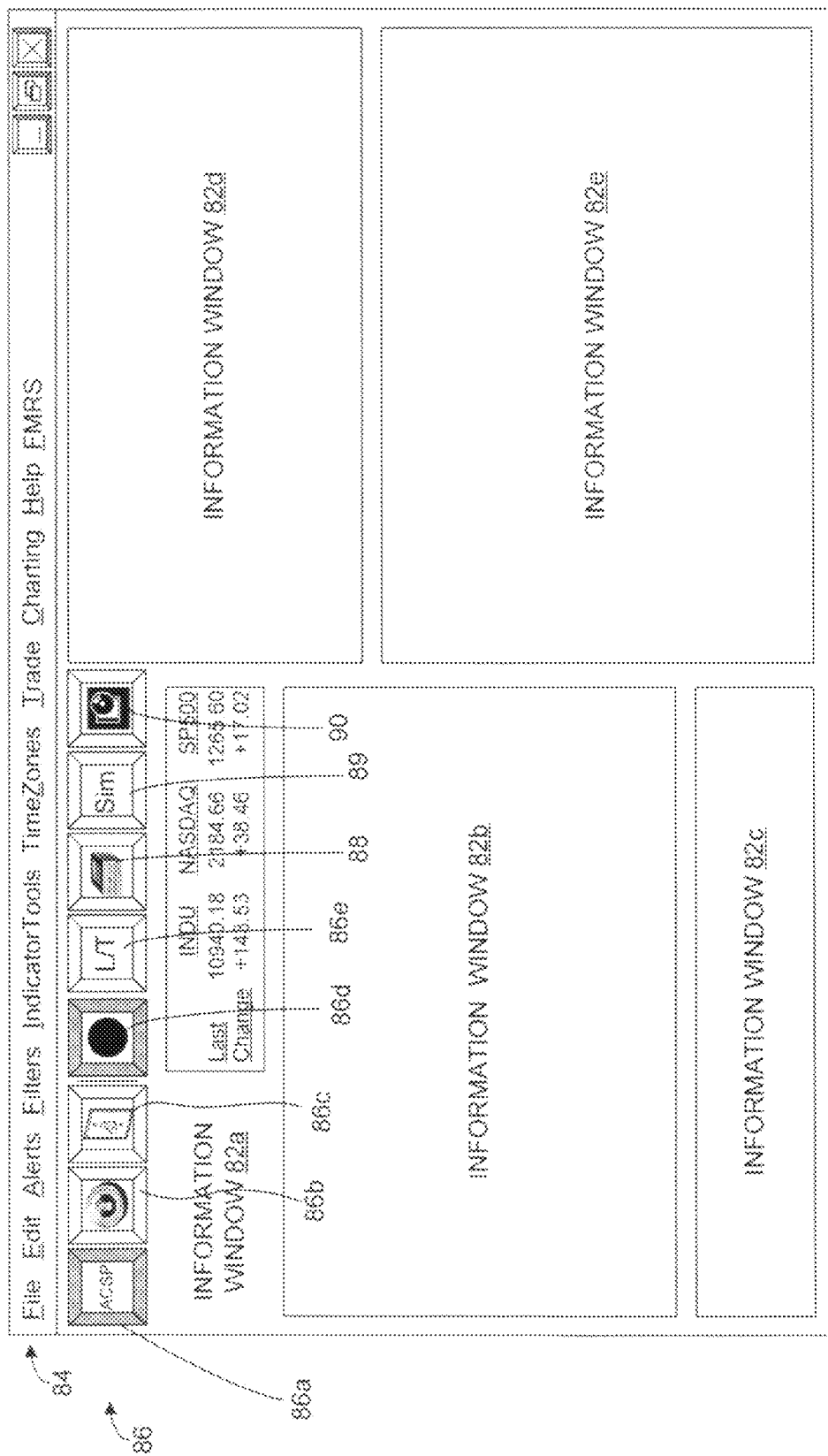
FIG. 11 is a schematic diagram of an exemplary GUI for a financial market replicator and simulator (FMSR).

As indicated above, exemplary embodiments of the FMRS include a market replicator 52, a market simulator 54, a freeze action component 56, a simulation/real-time switch 58, a learn/teach switch 59, and a market data manager 60. FIG. 11 depicts an exemplary GUI associated with FMRS options, which may be accessed, for example, by selecting the ACSP button 86a of FIG. 10. Button 86a acts as a toggle to change the buttons on the main toolbar 86 between buttons for FMRS options, and buttons for ACSP options. As stated above, while executing the FMRS, the ACSP functionality can remain fully active. Accordingly, the GUI of FIG. 11 bears similarities to that depicted in FIG. 10, although several of the functional buttons have been altered to permit access to specific features of the FMRS. As described with respect to FIG. 10, the freeze action component 56 and simulation/real time market switch 58, and learn/teach switch 59 may be accessible from the ACSP GUI, such as by using buttons 86b, 86c and 86e. As seen in FIG. 11, these options also may be accessed within the FMRS GUI. In addition, button 86a may be used to return to the main ACSP GUI. In the FMRS GUI, a user may have access to other components of the FMRS. For example, buttons 88, 89, and 90, may be used to access the market replicator, market simulator, and data manager options respectively. As with the other GUIs described herein, the FMRS GUI of FIG. 11 is an example and may be varied in form and content.

B. Market Replicator

The market replicator 52 records financial market data streams for use in the FMRS. As further described below, data recorded by the market replicator may be replayed as a simulation by the market simulator component. In a preferred embodiment, the market replicator may be integrated into the same ACSP that a trader uses for accessing real time data. For example, as seen in FIGS. 10 and 11, in one embodiment a market data recording may be initiated using a record button 86*d* from either the ACSP or FMRS GUI. The recorded market data may be received using the electronic data receiver 25 (FIG. 2). Also from either the ACSP or the FMRS GUI, as a market recording is being made, the recording of user metadata may be initiated using the learn/teach button 86*e*.

The market replicator records substantially the entire real-time market data stream(s) (also referred to as live market data), or any subset of markets thereof, in a manner so that playback of the recorded data stream through the market simulator replicates, as nearly as practicable, real-time market action as it occurs so a realistic market simulation may be generated. As a result, a user would have difficulty differentiating the playback of the data stream from live market activity. Furthermore, live data stream information provided to the ACSP still may be available while recording data or running a simulation. For example, real time alerts may still be triggered as previously defined by the user, real time displays may be up-to-date when the simulation exits, and so on.

The data for the market recording may come from various different sources. The scope of the recorded information may include trading data received from the exchanges, including Level I, Level II and Level III data. The data also may include news and information items from various news sources.

The various data and information may be received by the market replicator from independent sources and then intermixed for purposes of simulating broad market activity. For example, data items from the NYSE and/or related electronic exchanges, data items from NASDAQ and/or related electronic exchanges, data items from Forex and/or related electronic exchanges, data from foreign exchanges worldwide, headlines and news stories from Dow Jones News, the Wall Street Journal, and other news sources may be received. These data items are processed with an electronic processor that intermixes the data items, while maintaining the time order of the data, into a common simulated market data stream that represents substantially the entirety of the financial market(s), or a subset of markets thereof. The intermixing of the data may be performed by electronic processor 14 of the computer workstation and/or by one or more electronic processors dedicated to or shared with the market replicator functions. Thus, the market replicator is intended to record data of sufficient scope so as to permit a market simulation to replicate, be as nearly identical to, and virtually indistinguishable from, the real-time market activity as is practicable. In addition, the market replicator may generate multiple recordings simultaneously, such as, for example, multiple recordings in which each recording may be based on a different exchange, different set of symbols, or other delineations. In other embodiments, some or all of the data may be combined by a service provider before receipt by the user's computer (e.g., NYSE, and NASDAQ Level I and Level II, and Forex data may be received by the user as a combined data stream).

The market replicator also records user specific information in the form of user settings, and user metadata. Detailed descriptions of user information can be found elsewhere in this application.

Market recordings can be of any length. A recording can contain seconds, minutes, hours, or days worth of information. Recording length and size is limited for the most part only by the user's computer system capabilities The market replicator may record market data by encoding sequential market data into a variety of data blocks, described below, which then may be recorded onto a computer readable medium. The computer readable medium also may have stored thereon instructions that govern the encoding process. The recorded data may be stored using one or more types of data structures to facilitate compatibility with the various market data recording and simulation options. The FMRS data files may be structured using discrete data blocks of information, with each data block containing functionally integrated sets of information. The data blocks form a sequence of concatenated records. Depending on the content of a given block, some of the data blocks are self contained and do not relate to information contained in other data blocks, while some data blocks rely on other data blocks to be understood. Exemplary data block categories include: (1) initialization blocks, (2) market waypoint t blocks, (3) market streaming blocks, (4) cache blocks, (5) user waypoint blocks, (6) freeze point blocks, (7) alert blocks, (8) user settings blocks, (8) replay information blocks, and (9) user metadata blocks The first two categories (initialization blocks and market waypoint blocks) may be used by the market replicator to parse the data in a format appropriate for use by the market simulator. Initialization blocks may provide information (e.g., tags, flags, data objects, symbol sets, data block location, data block size, compression type, etc.) for parsing the recorded data, with each initialization block designating boundaries for a particular component (e.g., time frame, set of specified symbols, etc.) of the recorded data. The initialization blocks may be based on the character of the content of the recorded data to follow, such as frequently changing information that may be employed to interpret and parse the financial data stream.

An initialization block may contain, or reference, information the FMRS requires in order to replicate the market during a market simulation. This information may include but is not limited to the following information: the identity of the market recording, the structure of the recording, the identities of the market scope, of the market securities, of the market makers, of the exchanges, and other contextual information relevant to various embodiments. The information may also include the initial statistics and analytics relevant to each market and may contain, or reference, information such as the location and size of the various other data blocks, context information, data scope information, client default or view state information, mark initiating points for a market data recording or a significant portion thereof, and the like.

Market waypoint blocks similarly may be based on frequently changing information used to interpret and parse the financial data stream to follow. The market waypoint blocks include market data for a particular point in time, such as, for all symbols involved in the recording and/or simulation, trade prices at the point in time, trade volume at the point in time, and other Level I, Level II, and Level III and news data. In addition, it includes the values of all calculated analytics at the point in time. The data forming a market waypoint block provides all of the information needed to create an accurate reconstruction of the market at the corresponding point in time, or a data snapshot of the market. Waypoints, therefore, are constructed from the subset of timely information which is referred to as a data snapshot. In one embodiment, a market waypoint may automatically be stored periodically, such as, for example, every ten minutes, every fifteen minutes, every thirty minutes, once an hour, etc.

Waypoints provide a means for rapidly navigating through a market recording. Since the FMRS can reconstruct market conditions based upon a waypoint and what it references, navigation is a quick operation. A user can navigate directly to a waypoint, either forward or backward in the market recording, and start the playback of a market recording from that waypoint without sacrificing the accuracy of the playback. The simulation of the market at that point in time is the same as if the market recording were started from the beginning of the trading session.

As new market data is received and processed through the FMRS or ACSP, the new data information affects the information that preceded it. Analytics are updated, prices and volumes change, etc. Some of the new information is added to what was already there, while other previous information is replaced or deleted. Trade prices and times are always changing. Market makers come in and out of the market, and are constantly changing bid/ask prices and volumes. The changes within the ACSP occur continuously as the market unfolds. Any point of time within the market day is dependent on everything that has transpired so far before that point. If that point in market time is to be used from which to start the playback of a market recording, in order to accurately represent the market, a data snapshot of the market is taken. Otherwise, simply jumping forward in a data file would omit the information you jumped over and render the simulation inaccurate.

The data snapshot, once constructed, contains substantially everything current about the market. This is quite different from the present state of the art which preserves only a shallow and limited subset of the displayed information. As a result, analytics and analysis of such data are no different from the values which would have been obtained when the events occurred. If such preserved data contains only a subset of the user's universe, then the user is precluded from examining or receiving relative events concerning discarded markets. Also, if such preserved data shallowly contains only some of the display, analytic, and/or intermediate variables, then the user is precluded from examining discarded display information, and may get completely different derived, analytic values based on the limited amount of information retained. Using such a limited playback can be worse than nothing, since the experience can only be repeated by replaying the simulation in exactly the same way, and does not reflect what would have happened in live trading. This invention improves over the state of the art in its comprehensiveness as compared to conventional systems by providing complete financial market data, by providing accurate analytic data, by providing user experience data, and by providing user metadata.

Users would like to be able to jump to any moment in the market recording instantaneously, but this is not practical with today's computer hardware. Rather waypoints may be recorded with some time interval frequency, and the simulation jumped forward or backward to the desired point. The time interval at which these waypoints are recorded may depend upon either user preferences, or the host computer's capabilities.

Depending upon the number of securities being followed, at any particular moment in time, it may typically require several megabytes of storage space to record the data snapshot. In order to have the ability to start a market recording playback at any chosen second of the market session, data snapshot information would have to be saved every second. It is estimated that if this was done, a file containing data for 1,000 different simultaneously followed securities, for example, would require a data file containing about 46.8 terabytes of uncompressed memory per day. Markets consist of thousands of securities. This invention contemplates the saving of market data snapshots on a more frequent basis, limited only by technology. Breakthroughs in storage technology allow for the possibility that every piece of financial data could be stored without compression, thereby allowing for market recordings to be read and played forwards or backwards. A data snapshot is not simply a memory dump of all the data in the computer's RAM (Random Access Memory) that is used by the ACSP.

A data snapshot contains only enough information to be used as a baseline from which the start of an accurate simulation of the recorded real time market can be made. The accuracy of the simulation is insured by first loading the data snapshot information into the computer's RAM, and then starting the market replay of the streaming data block information from the point in market time represented by the these waypoint "snapshots". The continued replay of the market recording from the waypoint simulates with essentially complete accuracy the real time data stream.

Memory dumps would consume a considerable and impractical amount of the computer's resources. For example, an ACSP processing a data stream of 1,000 stocks and containing Level I and Level II data could consume up to 1 gigabyte of computer RAM for every memory dump. This invention contemplates the saving of market "snapshots" done as often as desired.

Data snapshots take significant resources to create, significant resources to store, and significant resources to reconstruct. The methodology of using data snapshots is an integral part of the functionality of the FMRS. The FMRS makes use of this current state of the art current technology. As the underlying computer technologies change, it is envisioned that the currently used technique of chaining data snapshots may be unnecessary, and that these data blocks may not be persisted within the computer hosting FMRS.

The market waypoint blocks, in addition to being self-contained data snapshots, contain backward and forward references, to each other within a recorded data file. This supports quickly jumping forward or backward in time from market waypoint to market waypoint within a recorded data file. They also tend to be self-contained and include such information as data compression configuration, various types of current national market data, and appropriate navigational references. Market waypoints may be used to break up the recorded data so that future replay or simulations from various points in time will be facilitated (e.g., a playback need not start at the beginning of a trading session and fast-forwarded to a desired point in time). The market waypoint blocks capture all of the market information in the data stream at a particular moment of market time. This information forms a baseline from which a market playback can start.

Market streaming blocks may comprise a representation of substantially every data item, data message, or value that is received in a financial market data stream including, but not limited to, Level I data, Level II data, Level III data, and news information. Other types of market data may also be included within the market recordings. The market streaming blocks may be related to or parsed based on the most recent initialization block, and relative to the most recent cumulative market waypoint blocks since the last initialization block. The market streaming blocks may include operational information, and recording of trading and quote data, and any other financial or news information that may be received by the market recorder. For example, a market waypoint block may contain a last trade price and size for each security on an exchange. To update the trade price, the market streaming blocks may contain a trade price change value and a trade volume change for each trade up to the next market waypoint block and a time of each trade (or an indication of the length of time between each successive trade). The trade price change value may be the difference between each successive trade (decreases being a negative number and increases being a positive number).

As an example, a market waypoint block may store, for an individual security, a trade value of $10.00 with a cumulative volume of 120,000 for the trading session. The market streaming block may store successive entries for following trades. Continuing the example, if the next trade occurs two seconds later for $10.02 with a volume of 5,000 shares, the first entry in the market streaming block may be a value of +2 for the change in trade value (representing an increase of two cents), a value of 5 (representing 5 thousand) for the change in volume, and a value of 2 for the time of the trade (representing 2 seconds). The change in trade value may be added to the trade value from the market waypoint block to reconstruct the market activity. If the next trade occurs a half second later at a price of $10.01 and a volume of 300 shares, then the second entry in the market streaming block may be values of −1, 0.3 and 0.5 respectively for the price change value, volume change value and time value. These values may be combined with the result of combination of the waypoint values and the first entry to obtain respective data values for the corresponding point in time. As will be appreciated, the process may repeat for each trade so that a running total may be maintained. Therefore, when the change values from the market streaming block are progressively applied to the value from the most recent market waypoint block during a simulation, the reconstruction provides the appearance of actual trading activity. Other Level I, Level II, and Level III data may be managed in a similar manner, or actual values may be stored in the streaming blocks.

Cache blocks may store or constitute particular data items that may be stored in a computer random access memory (RAM) during execution of the FMRS. As the user's ACSP operates, a variety of relatively current financial market data may be temporarily stored within RAM of the user's computer. This can include information such as recent or current time and sales, bids and asks, analytics, news, etc. The purpose of cache blocks is to save this information in a temporary state for incorporation into an FMRS data recording file. It is held in this temporary cache until it is written to the market recording, after which the cache is flushed and wiped clean.

The blocks so far described above, record non user-specific information. The FMRS may also allow the following user-specific data blocks to be recorded and maintained: user waypoint blocks, freeze point blocks, alert event blocks, and replay information blocks, and user metadata blocks. The FMRS may update this information based upon the user inputs from the user's last market recording playback. In an exemplary embodiment, these blocks are typically stored at the end of the recording, rather than in-sequence embedded with the market data.

Market waypoints are recorded automatically, but the user can also create additional data snapshots, called User Waypoints, which are also stored within the recording. These user waypoint blocks are referenced to user defined points of market time. They can be created on-demand, at pre-determined points of market time, or based upon pre-defined alerts or events being triggered. Market waypoint blocks can also be embedded and stored within the market recording at user defined intervals of time. User waypoints can be created at any point both during either the recording or playback of market of market data. In an exemplary embodiment, either during the making of a market recording or its playback, a user can click on a waypoint icon on the toolbar of the ACSP. Clicking on the icon creates and saves a waypoint for that point of market time. In another exemplary embodiment, a user can schedule a market time for which a user waypoint would automatically be stored. This can be done either during recording or playback. Any time a user waypoint is saved, a balloon tip message may be used to confirm the action.

The freeze point and alert data blocks are user-defined data blocks used to mark the recorded data stream for a variety of purposes. The freeze point and alerts may be recorded as data snapshot blocks, or in exemplary embodiments, as entries into a freeze point event table and an alert event table saved within a replay information block stored near or at the end of the recording. Freeze points constitute a user-defined market time marker for a selected point of interest in the recorded data stream. A user may specify a descriptive name or other identifier for each defined freeze point so that the freeze point may be selected at a later time by the user. Freeze points, optionally, upon playback, freeze the playback. Alert points provide another user specific, automatically generated market time marker for access by the FMRS. In particular, alert points may be define market data derived thresholds or events that may trigger an alert from the user. Knowing both when alerts were triggered in a previous real time or simulated session, as well the instructions which generated the events, can be valuable in a future playback. In particular, user actions are often prompted by alerts which make alert points natural points of interest for a user during a future replay or simulation. Other types of market events also may be marked and saved in the recording. The alert event table consists of all of the times and markets at which an alert was fired. Freeze points and alerts may be changed and saved to the recording any time a recording is initially made and/or subsequently replayed. User experience information may also recorded in the replay information block by providing ACSP user setting configuration information, or reference to the user setting block, and a sequence of the user actions within the ACSP timed to the market. Embedded narrative or active metadata may be triggered to play during a market simulation.

It is envisioned that the replay information system be extensible. Other types of market events, for example tags timing the replay of the market to any video recording, also may be marked and saved in the replay information block or in new block types within the recording. Saving the freeze points and alert events in the replay information block makes it easier to keep the recording current with the user's creation and deletion of freeze points, modification of alert settings, and creation and deletion of user waypoints which may occur any time a recording is initially made and/or subsequently replayed.

User settings blocks contain user specific information for the ACSP. Some common user specific information may include, but is not limited to, symbols lists, quote windows, charts, portfolios, layouts, colors, studies, personal notes and all other non-market user specific settings and data for the ACSP. User metadata blocks contain specific time sequential information that tracks user inputs and user interactions with the ACSP, and other communication and browsing software. As a market recording is being made a user can add and record time stamped layers of notes, voice narration, mouse movements, and other meta-data such as, but not limited to, images, emails, instant message conversations, web browsing history, etc. Although the market data never changes from simulation to simulation, the user experience and how the user interacts with the ACSP typically does. Keeping track of how the information displayed in a recording, or simulation, is being used and processed by the user may be an important supplement to the financial market data itself. User metadata blocks provide a means by which a user can replicate how the FMRS was previously used. Since market recordings can be shared with others, saving metadata may have a profound implication as a teaching and learning tool. On playback, the display of the sequence of user actions within the ACSP, can be timed to the market, and played back, with or without user action such as prompting, verification, etc., at the correct market time. A novice trader can replicate the simulation experience of an expert trader. User metadata may be changed, added to, or deleted and saved any time a recording is initially made or subsequently replayed.

At the completion of a market recording, the user settings block, user waypoint blocks, replay information blocks, user metadata blocks and other user-specific data blocks are added to the recorded data file. Doing this enables the user to experience the essentially exact same ACSP settings that were in effect during the time of the market recording. Upon subsequent replay, the FMRS may give the user the option to save their changed selections and information to the market recording so it is available on subsequent playbacks. The FMRS may keep these revised block collections distinct or may simply replace the user setting block, user waypoint blocks, replay information blocks, and other user-specific blocks.

Although waypoints and freeze points both provide flags to points of interest within an FMS recording, there are functional differences between the two. A market recording can be quickly jumped to a waypoint. When jumping to a freeze point, or an alert point, or some other explicitly requested market time, the recording must be played forward from the previous market waypoint. This is because waypoints contain all of the data snapshot information needed to accurately replicate the recorded market. Freeze points and alert points do not. Freeze points and alert points are typically used during the playback of a market simulation as points of interest, rather than as a point from which to begin practice. The timestamps associated with freeze points, alerts and other points of interest, relative to full data snapshots, conserve resources, and still maintain flags to the points of user interest. The ACSP may allow the user to elect to freeze playback at existing freeze points, newly added freeze points, waypoints, alert events, or any other time or condition specified. During market playback, a user can also create a new user waypoint.

The various data block categories provide mechanisms for defining or customizing the playback of a market recording by the market simulator component (described below). For example, a user may select to replay a market recording beginning at an initialization block through or up to a particular market waypoint block or freeze point. A user may select to replay a market recording between two or more freeze points, or for a particular time period beginning prior to and ending after an alert event. Once the ending time has been reached, say at a freeze point, the user may choose to continue playback, or not. It will be appreciated that the user may employ various combinations of the market waypoints, freeze points, user waypoints, alert events, and directly specified times to achieve a highly customized marked recording, with such markers later being accessed during a replay simulation. In one embodiment, all data (or its data structure or presentation thereof) is recorded as received and typically not filtered in any way. This permits future replay with or without filters, depending on the preferences of the user at the time of replay.

Figure 12:
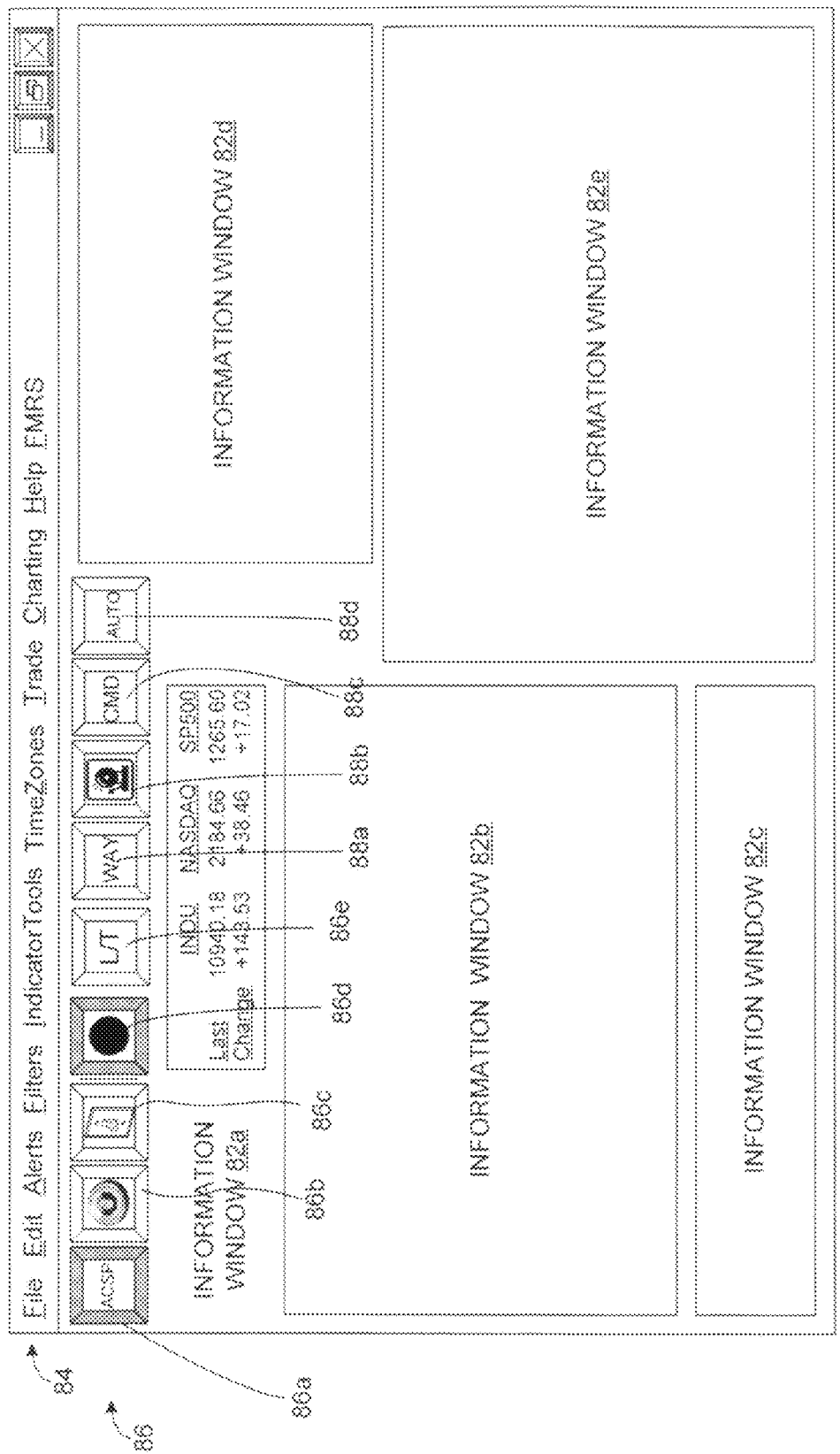
FIG. 12 is a schematic diagram of an exemplary GUI for a market replicator component of the FMRS.

FIG. 12 depicts an exemplary GUI for the market replicator. As with the other GUIs described herein, the market replicator GUI of FIG. 12 is an example and may be varied in form and content. As indicated above, a user may enter the GUI for the market replicator options and commands by selection from broader menu options accessible from within the GUI of the FMSR, such as by selecting the icon 88 of FIG. 11. The FMRS and/or ACSP GUIs may also include a data recording button 86d as stated above, and the button 86d may also constitute an indicator that changes color or appearance to indicate the market replicator is actively recording. Multiple pressings of the button 86d may also toggle between starting and stopping or pausing a recording. Also, as stated above, the FMRS and/or the ACSP may include a learn/teach switch button 86e, which provides for the recording of user metadata. The button may include an indicator that also changes color or appearance when recording, Once within the market replicator GUI, a user may have a variety of available commands to initiate and customize a market recording. For example, various toolbar items or drop-down menus may provide available commands associated with manipulating recordings, such as, for example, generating a new recording, displaying and/or changing a market recording name, starting a recording, saving a recording, scheduling a recording, and others. A user may also select particular storage locations for the recording. Other recording options may pertain more specifically to the scope and/or precise content of the recorded information. Such options may include selecting particular market exchanges and news sources, limiting the recorded information to particular vendor-supplied data, defining various combinations of specific stocks, markets, exchanges, and news, and the like. The basis for content parameters may be user-defined or follow from external restrictions, such as hardware or network capabilities, subscription limitations, or others. Other recording and/or scheduling options may pertain to the timing of the recording, including recording one or more particular portions of a trading day, setting specific trading days, specifying whether to include premarket and/or after-market activity, and the like. Scheduling options can also include starting a recording automatically when user defined conditions or alerts are triggered.

The exemplary market replicator GUI of FIG. 12 includes button functions and the like carried over from previous GUIs, which may be useful while accessing the market recorder. Additional functional buttons or icons are depicted in FIG. 12, which may be appropriate to the market replicator itself. For example, a button 88a (WAY) permits a user to define a waypoint, and the button 88b similarly permits the user to define a freeze point. Pressing one of these buttons may open additional more specific menus, submenus, or options that would permit a user to provide defining information such as a name of a waypoint or alert, a time of waypoint (current or other), an event to trigger an alert to be marked in the recording, moving to a next/previous waypoint or alert, deleting waypoints or alerts, and so on.

The exemplary GUI of FIG. 12 also includes a command button 88c (CMD), which may be selected to open submenus or input options for specific recording commands, such as starting a new recording either by user action or automatically, scheduling, stopping and saving, pausing, resuming, saving to a particular directory, and so on. The market replicator also may generate alerts for the user regarding available memory space, disk or storage space, and other messages that may identify issues that may impede a recording.

In connection with setting the various recording content and timing parameters, the market replicator may include an "Auto-Record" feature. In the exemplary GUI of FIG. 12, a command button 88d (AUTO) may be selected to access the auto-recording features described herein. Using auto-recording options, the recording parameters to such as the start time, end time, or duration may be defined once and then applied repeatedly to generate a customized set of recorded data with minimal effort. As part of the Auto-Record feature, waypoints may be set which would be applied automatically to the recording, such as setting waypoints at specific times of day, time intervals, and the like. Similarly, alert point blocks/records may be identified to be marked automatically in the recording when an appropriate alert is triggered. The Auto-Record feature may also generate user prompts regarding the status of a recording, such as when a recording is unexpectedly interrupted, complete, or may be approaching a storage capacity limit or other restriction. A user may schedule particular recording periods by day or days of the week, time of day, market session (pre-market, intra-market, after-market), one-time versus recurring, and the like.

If the recording of a market session is interrupted, the FMRS may save each recorded segment in separate data files.

C. Market Simulator

The market simulator 54 plays back the recordings generated by the market replicator 52. In an exemplary embodiment, the market simulator is integrated into the same ACSP a trader uses for analyzing "real time" data corresponding to live market activity. The market simulator simulates financial markets by replaying the recorded market data so that a trader can re-experience market activity and refine real time market analytical and trading techniques. Market activity is played back in a manner intended to resemble actual market activity with such realism that an observer would find it difficult, if not impossible, to differentiate the playback from the "real-time" market. In addition, the market simulator may be employed to replay recorded market activity over and over again as many times as desired.

The market simulator may decode the encoded data generated by the market replicator for playback. A computer readable medium may have stored thereon instructions that govern the decoding process. Control segments that control the timing of the playback, such as starting and ending points, may also be stored.

By being able to replay the same market recording over and over, a trader has a tool available that can help him or her in several different ways. One way is to refine analytical and trading techniques. For example, if a trader made a mistake in real time trading, a trader may use the market simulator to replicate the market conditions at the time, and under the conditions, that the mistake was made. The trader may then adjust his or her technique in an attempt to determine whether a better outcome could have been achieved by modifying their trading strategy, and/or using different alerts, different window layouts, different analytics, different parameters for the analytic methods, different trade entry, monitoring, position adjustment, and exit techniques, etc. This process may be repeated multiple times while varying the trading strategy, analytics, and alerts, dismissing some, adding others, until a successful trading strategy has been created. Subsequently, the strategy may be tested under various market conditions by applying the strategy during playback of other recordings. The market simulator, therefore, permits a trader to refine and test trading strategies by replaying the simulated market around a point of interest as many times as desired, and/or during multiple trading sessions.

Another way a trader can use the market simulator to improve his/her trading skills is by making use of its numerous options for adjusting the nature of the replays of recorded market activity. In addition to replaying the market at real time speed, the market activity can be played back at speeds other than real time speed. For example, the market activity can be played at slower than real-time speed to allow the user to practice strategies in a more deliberate fashion as the market activity slowly unfolds. Alternatively, the market activity can be replayed at a speed faster than real time speed to allow the user to fast-forward through non-interesting portions of the market activity. A faster replay may also provide more challenging conditions for developing a trading strategy, or provide results of testing a trading strategy more quickly.

Also, a market replay can be frozen at any point to allow the trader to investigate the coactive interactions and relationships between one or more securities, indices, analytics, news, etc.

Making a market recording, running a market simulation, or doing both at the same time does not interrupt the flow of real time data to the ACSP software even if the ACSP is not displayed. Accordingly, any previously defined real time alerts will still be triggered, and any previously defined real time market recordings may continue to be made. When a market simulation is terminated, the user may return to the primary instance of the ACSP in real time data display mode, which would reflect current market conditions. Multiple secondary instances of market simulations may run while the real time primary ACSP continues to operate, regardless of running in the background, foreground, or otherwise located on the Windows desktop. Users also may switch among such multiple simulations that may be running at a given time. A user, however, need not run both a simulation and the primary instance of the ACSP simultaneously. Rather, a user may switch from the primary ACSP and run one or more simulations independently of the primary ACSP. Also, a market recording may be made while not in simulation mode.

A market simulation may be accessed and played from a variety of sources. Not only can the market simulator playback recordings made by the market replicator, but historical recordings may also be downloaded from a data vendor. For example, data for the market simulator may be data previously archived or stored on the user's computer by the market recorder. Simulation data may be requested from a data vendor, from recordings made from streaming market data for a given trading day, based on historical market information for other than the current trading day obtained by accessing historical data files, and so on.

In an exemplary embodiment, by default, the data contained in a market recording is limited only to the information contained in the recorded session's data stream. Historical data from market session times before the recording is kept in other data files. As the market recording is played, any information not embedded in the recorded data stream, but needed to populate charts, quote windows, etc, is obtained from other data files located either on the user's computer, or stored on local or remote data servers.

Information displayed within a simulation may be comparable in content and format to information displayed using an ACSP when running real time data. For example, as is known in the art, an ACSP may generate market information in the form of quote windows, time and sales windows, Level I and Level II data windows, watch lists, filters, charts, studies, news, analytics, etc. The types of information and information windows presentable by an ACSP are myriad and well known in the art. A user may navigate among the various windows and manipulate or alter content in numerous ways. Comparable information and functionality may be reproduced as part of a simulation so, as stated above, a simulation reproduces a market experience for the user as near as practicable to the real time experience generated by the ACSP.

The market simulator may also be customized to trigger market alerts. Similar to setting alerts for the real time data analyzed by the ACSP, simulated alerts may be defined to operate within the FMRS as the market simulator replays market activity. For example, news alerts, trading opportunity alerts, charting alerts, and the like may operate within a simulation. As the market simulation playback moves through a recorded trading day, alerts can arise as if the market activity were occurring in real time. As when running in real time, alerts defined to operate within a market simulation may be displayed and be recorded in a number of ways.

The market simulator also may include features associated with simulated portfolio tracking comparable to portfolio tracking based on real activity. Portfolio tracking is known in the art. By providing a window in which the user may record their real or simulated trading actions, the user is able to see their real or simulated account status during the simulation session, and the accumulated results. Typically information relating to securities positions, trades, gains and losses, commissions and expenses, market value, etc. organized in a variety of ways (e.g., by broker, account, customized groupings, etc.) The market simulator may be employed to define one or more simulated portfolios to record and save simulated portfolio information, and to track the performance of the simulated portfolio. The market simulator may generate and reproduce multiple iterations of simulations of a given portfolio. A user thus may apply different trading strategies to the same portfolio over the multiple iterations so the trader can compare the results of successive trading simulations using the same trading period and data, manipulated using different combinations of trading strategies, analytics, and alerts. This can allow users to see what strategies worked best for the given market period and for a given portfolio. Such features may also be expanded to apply to multiple portfolios, to allow saving simulated portfolio tracking information from different playback sessions independently, and provide a way to make comparisons.

In utilizing an ACSP, as the real time market data is received, the user typically opens a variety of windows relating to a portfolio showing quotes, charts, analytics and so on, navigates from one window to another, changes the securities being viewed, alters the statistical analyses being performed, etc., as the user navigates through parts of the software program. The user tracks the market activity in one or more securities and at times may decide to take action or trade on one or more such securities. Trading activity is updated within the portfolio presentation as the user acts. Comparable functionality is available to the user when running the market simulator. In other words, a user of the market simulator would experience the market during a simulation in essentially the same manner as when using an ACSP in real time. In addition to viewing a replay of recorded data, in the simulation mode, the user may execute simulated trades, define analytics, open and navigate among numerous information windows, and so on. As a result, the simulation mode would be largely indistinguishable from a real time experience.

As is known in the art, it is not uncommon for price, volume and other types of errors to be included in the real time data generated by the market exchanges. This can happen in many different ways. A trade for one security may get transmitted for a different security. A trade may be recorded with a wrong price, missing digits, transposed digits. A trade may be transmitted out of sequence. The exchange may rescind a trade or quote based on rule violations. The electronic system by which the information is transmitted occasionally introduces random errors or systematic glitches. Indeed, none of the exchanges transmits data completely error free.

For this reason, as also is known in the art, the exchanges typically use proprietary software, monitored by designated teams of employees, to continuously monitor their data flows attempting to identify data errors. When errors are found, appropriate corrections are made. Often, errors are corrected before the information is transmitted outside the exchange, but this is not always the case. If the erroneous information has already been transmitted from the exchange, the exchange will typically transmit corrections to correct the errors. Such errors may include adding trades that were not previously reported, correcting trades because of an error in time, price or volume information, canceling trades because they never took place, and others. It is, of course, desirable that errors be corrected promptly, and most errors are caught and corrected shortly after the error occurs. This is not always the case, and it can take up to several hours or more before the correction process is completed in certain cases. Sometimes the error is only reported as a news item, and no specific electronic correction is generated.

Errors, therefore, exist in real time market data feeds and thus are accounted for as part of the real time trader's decision making process. Because the purpose of the FMRS is to simulate the real time experience as identically as practicable, the FMRS records the transmission, errors and all, and reproduces such errors and associated corrections as the market simulator runs a simulation. Some in the industry simply correct their records, and perform their analysis as if there had never been an error. This is a short-coming that is avoided by this invention.

Utilizing the above features of the market simulator, a trader has the opportunity to practice various market strategies using the FMRS software. The trader can learn from simulated results and his or her mistakes, and develop and test new strategies and heuristics. The trader may also generate or define new statistical indicators and analytics, and create associated alerts to test the indicators against the recorded market data. The trader's skills, therefore, may be refined and rehearsed with repeated practice, and a trader may then apply such improved skills to real time activity.

For example, as stated above, in addition to playing back a market recording at real time speed, the user has the option to set the market simulator to play the simulation at speeds other than real time speed. The markets develop quickly, and the speed at which market information unfolds can be overwhelming. Operating the market simulator at slow speeds has the advantage of allowing the user to first get a feel for the interactions taking place, and to practice his or her trading techniques until mastered at slower speed levels. Simulation at slower playback speeds allows the user to practice his or her reactions to market activity and information without being overwhelmed by market conditions. As the user's skill increases, the speed of the simulation may be increased commensurately to provide an increasing challenge for the user so as to verify their readiness for future challenges Exemplary user-selectable playback speeds may include: full speed—as fast as the user's computer will process the data without regard to the original real time spacing of market data; normal speed—which accurately replicates the actual real time market activity; and various other speeds either faster or slower than normal speed. In this manner, a beginning user may begin at a slower than normal speed so as not to be overwhelmed by the flow of market information. As a user's understanding of, and reaction to, the markets improves, i.e., as the user solidifies strategies/heuristics, hones alerts, refines the application layout, improves reaction time, etc., the user can speed up the simulation speed to normal speed. As the user's skills improve further and his methods mature, the user can run simulations faster than market conditions, up to full speed, to present new challenges and attain more confidence in the ability to keep up with fast moving markets. Once a user has reached a comfortable skill level and has developed effective trading strategies, the user's skills and strategies may be applied to the real market.

The playback speeds also provide a logistical tool that permits a user to focus on particular points of interest in the market data. For example, a user may fast-forward or jump through mundane market activity to a point of more interest within the simulation. Once at the point of interest, the user can freeze the simulation, use the full features of the ACSP to study the new point of interest, then resume playback at any user selected speed, fast forward, or jump forward or backward to waypoints.

The financial market data contained within the FMRS data blocks is time ordered data typically packed one message after another, and compacted tightly together in order to minimize data file size. The number of real time messages in a data stream that represents a unit of market is extremely variable. For example, when the market is less active, such as in pre-market or post market conditions, there may only be a few data messages needed to represent a minute of market time. By contrast, during active market hours, hundreds or even thousands of messages may be needed to represent one second of market time. In order to realistically replicate market action, during playback the financial data information contained in these data messages, is played back in at controlled rates of speed to accurately reflect the passage of time. For example, if the simulator needs to process 200 messages in order to play back one is second of market time, it processes those 200 of messages over one second of real time. If the simulator needs to process 1,000 messages in order to play back one second of market time, it processes those 1,000 of messages over one second of real time. In a similar manner as just described, it processes the data to realistically replicate the passage of any unit of time, whether the unit of time is a fraction of a second, a second, a minute, an hour, etc.

As described elsewhere in this application, an aspect of this invention is that the market simulator can play back the data messages at any user selected playback rate. It can replicate normal market speed, faster than normal market speed, and slower than normal market speed, or as fast as the computer system running the simulator can process the data. Also, as described elsewhere in this application, the market simulator can freeze the replay of at the market at any moment of market time.

When adjusting the speed of or freezing the playback, the market simulator may generate and combine asynchronous messages that reflect such controlled, frozen, or uncontrolled rate of playback. For the above example of 1,000 messages per second, if the playback is at half speed, the market simulation would process 500 messages per second. If it was played back at 5 times normal market speed, it would process 5,000 messages per second. As described elsewhere in this application, during a simulation playback, user inputs may be entered and recorded. These user inputs are marked and saved to the correct point in market time. For example, if the playback is at half speed, an input by the user after one minute of the user's real time from a given point would be treated as entered after 30 seconds of the market time of the playback. Conversely, if the playback is at twice speed, an input by the user after one minute of the user's real time from a given point would be treated as entered after two minutes of the market time of the playback. In the situation of a frozen playback, all inputs would be treated as entered at the frozen point regardless of when the user enters the input in real time. In this manner, the FMRS time-synchronizes user inputs in accordance with the altered playback speed so that a simulation begins or is otherwise correlated and matched to the correct corresponding market time in the market data stream.

Figure 13:
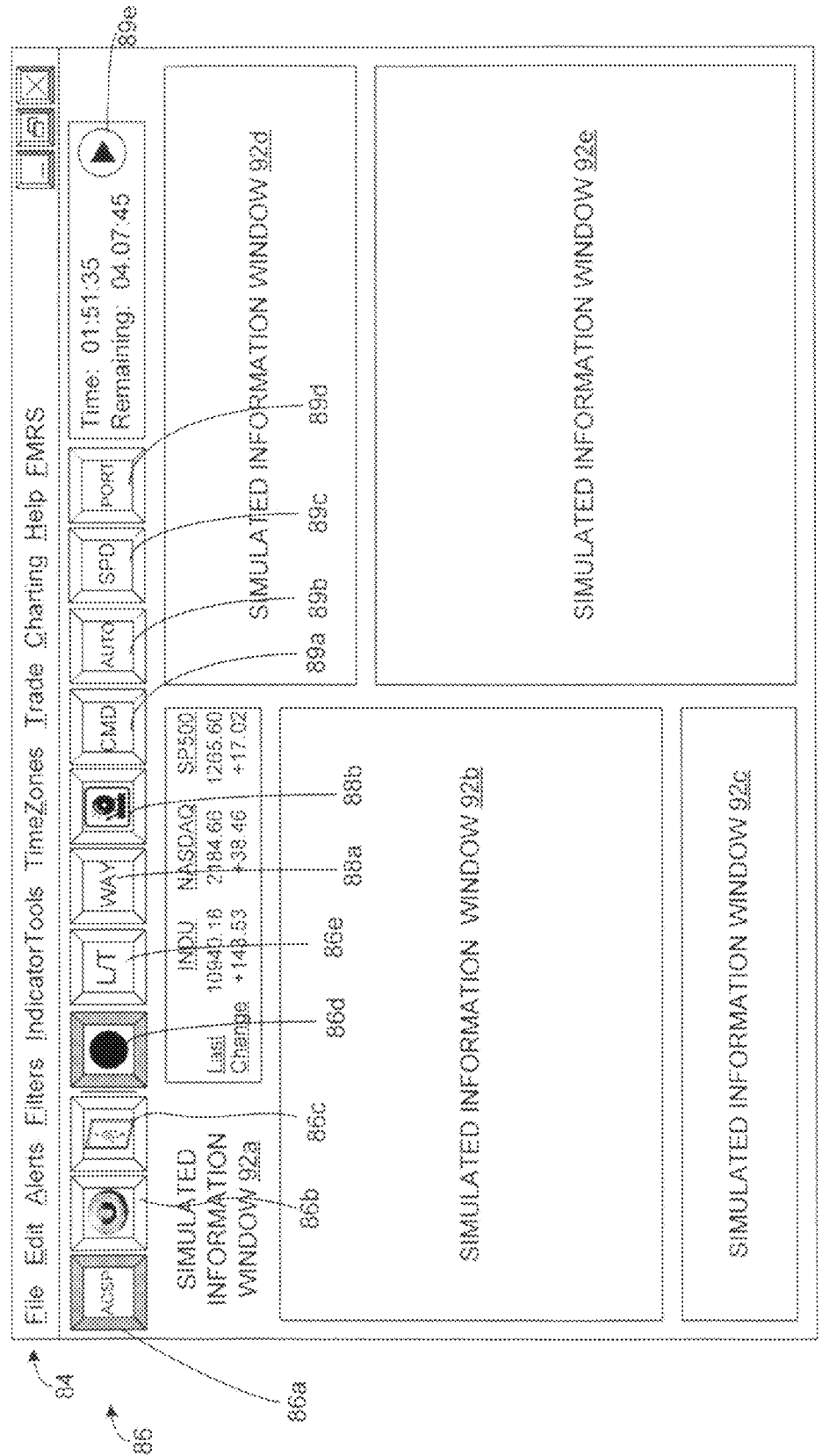
FIG. 13 is a schematic diagram of an exemplary GUI for a market simulator component of the FMRS.

FIG. 13 depicts an exemplary GUI for the market simulator 54. As with the other GUIs described herein, the market simulator GUI of FIG. 13 is an example and may be varied in form and content. As indicated above, a user may enter the GUI for the market simulator options and commands by selection from broader menu options accessible from within the GUI of the FMSR, such as by selecting the icon 89 of FIG. 11.

Once within the market simulator GUI, a user may have a variety of available commands to initiate and customize a market simulation playback. For example, an "FMRS" item in the main tool bar may include submenus to select a new simulation, display simulation information, and the like.

In many respects, the market simulator GUI has common features with the market replicator GUI. For example, the market simulator GUI has input buttons that permit a user to return to the ACSP (86*a*), freeze the simulation (86*b*), switch between the simulation mode and the real time mode (86*c*), initiate a data recording (86*d*), initiate a user metadata recording (86*e*), or begin a new simulation.

In addition, similar to the market recorder, the market simulator GUI also may include input buttons that permit a user to define user waypoints (88*a*), and freeze points (88*b*) during playback (instead of during recording). In turn, the market simulator options may be used to customize the playback based on such waypoints, freeze points, and alerts. For example, the FMRS may allow the user may set the simulator to replay the recorded data starting at a waypoint, ending at waypoint, or between two waypoints. Similar replay parameters may be set relating to freeze points, alerts and other events that have been marked in the recorded data, whether marked during recording or during subsequent playback. Waypoints may be used to jump to portions of the data, such as jumping to the next or previous waypoint (or other user defined event), jump to a next or previous snap shot, jumping to a named or numbered event, replaying the data just prior to and subsequent to an alert or waypoint, and so on.

When buttons are pressed for user initiated waypoints and freeze points, they are often pressed after the point of interest has passed, and are therefore late by nature. To make the saving of waypoints more timely, the FMRS may buffer and cache the previous minute's data snapshot in the computer RAM and create the waypoint from the point in time of the data snapshot. In a similar manner, the time of a freeze point may be created with a timestamp of, for example, one minute earlier. Look back times other than one minute can be used. As a user increases his or her understanding of a given event, it is typical to refine a set of user waypoints in order to provide better views into points of interest for replaying and studying the event, and to quicken the research process.

In addition, the market simulator GUI may include a command button (CMD) 89*a* that may provide access to a menu of playback commands for playing recordings. Such commands may include, for example, play/stop, pause or freeze action, fast-forward or fast-reverse, incremental (e.g., jump) forward or incremental reverse, and others. The menu may provide the user with a choice of whether the learn/teach button 86*e* should default to the learning mode or the teaching mode when pressed, plus any other options available to the Learn/Teach Switch Component.

The market simulator GUI also may include an information window 89*e* containing additional information regarding the status of a playback. Such information may include time played, time remaining, whether the simulation is playing as opposed to being paused or frozen, and the like. As described above, a feature of the market simulator is the ability to adjust the playback speed. In one embodiment, therefore, a dedicated speed command button 89*c* (SPD) may be present in the market simulator GUI to provide access to a menu of the various speed options described above. In addition, insofar as a user may be testing trading strategies by acting on a simulated portfolio, the market simulator GUI may include a dedicated portfolio command button 89*d* (PORT) to access the various options for trading, altering, and otherwise manipulating simulated portfolios.

In connection with setting the various playback parameters, the market simulator may include an "Auto-Run" feature accessible in the GUI with a corresponding "AUTO" command button 89*b*. Using such an option, the playback parameters described above may be defined once and then applied repeatedly to generate a customized playback with minimal effort. Similar to the above, Auto-Run options may include such features as playback speed, starting and ending options, waypoints, freeze points, alert point settings, and others. Auto-Run options also may be used to replay certain significant events selected by the user, which may be replayed in a loop fashion that replays the event repeatedly until interrupted by the user or an automatic time-out feature. The auto-freeze option may be used in conjunction with the freeze action component 56, described below, to afford the user additional analysis capabilities to study market information at the time of the freeze. Yet another playback option allows a user to automatically replay multiple market recordings, in a continuous fashion, one after another. They can be replayed in a specific order, or randomly, at the user option.

During a market simulation, all of the functions of the ACSP are available to the user. The user can change any the settings, colors, chart types, default windows, layouts, etc. The user can also add or delete user waypoints, freeze points, and alert points. User settings can be changed any time a recording is played.

Users can also add notes to charts, note lists, and other forms within the ACSP. These notes may be time stamped, and can be made either during the real time trading session, or during a simulation. As a market event takes place, the user might want to make a note to go back and investigate the event at a later time. The note could reference a specific security, or be general in nature. It could contain simply the user's observation or impression. Similar to a waypoint or freeze point, a note could be linked to a particular market moment. Perhaps a user would make some sort of observational note, such as "Wow, the pressure was growing quickly here. Replay the simulator and look at the previous ten minutes and see when the change in pressure was first noticeable". As is readily apparent, notes could be used for a wide variety of reasons relating to market action. Notes may be kept with the user's other settings.

Upon the completion of the playback of a market recording, the user may be prompted to save any changes made to user settings (charts, colors, layouts, etc), waypoints, freeze points, alerts and notes to the recording, etc. It is not the intent of the applicant to list all of the possible changes that can be saved. That is beyond the scope of this application. It is just to show that any possible change available within the FMRS may be saved at this point. These changes will persist and be available to the user the next time the same market recording is replayed. In this way, a user can take advantage of any knowledge gained during a simulation for future use and refinement. The user may also be prompted to save the market recording with a different name. Doing this would allow a user to compare the results of different user settings and user metadata.

In connection with the ACSP, various information windows 82*a-e* (FIGS. 10-12.) may be generated. Such information windows may be viewable during operation of various aspects of the FMRS. The market simulator is intended to offer the full scope of information access regarding a simulation as is available with respect to monitoring real time market data with the ACSP. As seen in FIG. 13, therefore, information windows 92*a-e* may display simulated information identical in nature to the information windows 82*a-e* available when operating in real time with the ACSP. In this manner, the market simulator may provide an experience as nearly identical as is practicable to a real time experience.

D. Freeze Action Component

The freeze action component 56 provides a mechanism for the trader to freeze the display of real time or simulated market activity in the FMRS or the ACSP. It freezes, at an instant of market time, the state of substantially every piece of information that would otherwise be changing in the ACSP. This includes, but is not limited to, substantially every trade price, every bid and ask price, the value of every study and indicator, and every piece of news. The freeze function gives a user the ability to research and explore market interrelationships in ways that are not available in conventional trading systems. The freeze function creates a dynamic portal into a static market.

Markets often move at a dizzying pace, especially in periods of trading imbalance, where there is money to be made. This invention freezes the market and thus provides the trader with the ability to explore, research, and consider any inter-market-relationships, intra-market relationships, and cross-market relationships that may be embedded within the financial market data, and that would otherwise not be readily apparent due to the rapidly changing nature of market activity and market data. It gives the trader time to research news reports, forums, and other sources. It gives the trader time to consider how they are interpreting the information, what analytics are being used, and how they are being used. These new discoveries can be made based on the ability provided by the present invention to study markets in a frozen state. Many traders seek out opportunitistic relationships among the interactive and collective behaviors of the market's participants. A trader may desire to learn how to react to news. A trader also may desire to learn how to identify and assess key conditions by studying various interrelationships of activity, such as correlations in activity in one stock versus the activity in other stocks, correlations between activity of various stocks within various sectors of the market, correlations in market maker behavior, and so forth. The freeze action component 56 permits the inspection and discovery of the interactive and collective effects at work in the market.

During the normal real time trading day, information is updating continuously. For example, even with a portfolio of only 100 stocks in a trader's watch list, the trader can be presented with hundreds, if not thousands, of new pieces of information per second. It is thus impossible for a human being to mentally digest and assimilate this quantity of information. Although a conventional ACSP keeps up with the real time market activity, a trader using a conventional ACSP does not have the ability in real time to see all the data and associated analytical alerts that the trader may have set for triggering.

The freeze action component allows the trader to stop and examine, for as long as the trader desires, any part of the market at a given moment in a given trading period. The ability to freeze the market enhances the trader's ability to develop the real time skills necessary for successful trading. For example, if an alert set by the trader is triggered, a variety of recognitions and actions should follow for the trader to actually capitalize on such an event. A trader would first seek to check on the validity of the alert. A trader may need to determine which stock generated the alert, view the chart of the alerted stock, check a news item or underlying event triggering the alert, and so on. The FMRS provides the trader opportunities, through research and practice, to enhance the speed and efficacy of such responses to events in the market. As one feature, the market freeze component freezes a simulation in time so the trader may analyze an alert independent of the pressure of real time market activity. In this manner, a trader may practice and improve the speed and skill of reaction to an alert so that the trader may respond more effectively to real market alerts generated during actual trading.

The exemplary GUI's of FIGS. 10-13 include a dedicated button input 86b to execute the freeze action component 56. Although the precise method of accessing the freeze action component may be varied, the figures demonstrate that the freeze action component may be launched from a variety of operational points within the ACSP and/or FMRS.

The FMRS can freeze a real-time market. Having this ability, when coupled with the market replicator, opens the possibility for a whole new level of understanding while trading. If the trader finds that his or her research is too involved to leave the markets frozen, a secondary ACSP may be employed to jump to that freeze point while the primary ACSP is allowed to continue, perhaps on a different monitor. The secondary ACSP can then be run jumped backwards and forwards, to the trader's satisfaction, without undoing the interference with the trader's real trading. Such features are lacking in conventional systems.

For example, as is apparent from FIG. 10, a user may access the freeze action component 56 from within the ACSP itself while the user is monitoring real time data. Suppose, for example, a user following real time market activity using an instance of the secondary ACSP is at the same time recording and storing market data with the market replicator component 56. The instance of the secondary ACSP can play back the market recording, while it is still being made, in near real time mode with only a second or so delay from real time. As technology increases, the near real time mode can have a delay that is indistinguishable from the real time market mode.

While a recording is being made by the primary ACSP, the full functionality of the ACSP remains available in any secondary instance. If, for example, the user executes the freeze action component of the simulator to stop the market replay, or any other playback option or feature of the ACSP, once the user has completed their investigation, they can catch back up to near real time. This can be accomplished by running the simulator at full playback speed from their current location within the simulation, or by navigating directly to the waypoint closest to real time and then running the simulator at full playback speed.

The user may execute the freeze action component using a toolbar button or action item 86b in the ACSP GUI or toolbar. Although the market freeze action component may be accessed by other means (e.g., a dropdown menu, menu tree, or other selection means), an iconic system has advantages because an icon button may be accessed quickly and may act as a toggle between freezing the market activity, and either resuming a market simulation, or monitoring and displaying real-time market data. When the freeze action component is executed, the data displayed within the various display windows within the ACSP cease updating. In other words, the "frozen" data may present a snapshot of the real time data at the time the user executes the freeze action component.

A market freeze point can also be created automatically when a user defined alert is triggered. As one experienced in the art appreciates, alerts can be based upon, but are not limited to, trade prices and or volumes, market maker bid/ask prices and/or volumes, analytics, chart trend lines, user studies, market transactions, news, other market maker activity, time coincident inter-market and inter-security activity, etc. There is no practical limit on the number and type of alerts that can be defined and used to automatically create freeze points. Regardless of how a freeze point is created, a balloon tip message may be used to inform the user.

As an example of real time analysis using the ACSP, suppose the user has noticed an interesting event transpire in real time and wishes to study the event. If not already started, the user may start an instance of the secondary ACSP and execute the freeze action component to freeze the market activity at the time the event was noticed. The frozen market provides another type of simulation capability of the FMRS. For example, as the FMRS user typically would be simultaneously recording the live market data, the user may playback the simultaneous recording of the data, say by a few minutes, to a point just prior to the event, and watch a replay. A user waypoint or other marking may be generated in the recording to reflect this earlier time. From this waypoint, the user can replay the interesting market event as many times as the user wishes. For example, the GUI for the ACSP may include a "Replay from Beginning" (e.g., from the beginning of the recording, trading session, or other known point in time, such as a user created waypoint) menu or command to begin replaying the event from the desired point in the recording, even as the recording of real time data continues. In one embodiment of the FMSR, the GUI may switch to the market simulator GUI (secondary ACSP) of FIG. 13 so a user may access all the market simulator options and functions.

The user may then access all the program windows of the ACSP and associated data around the time of the event. In this manner, the user may study what may have caused the event, and, by continuing the replay forward, determine what effect the event may have had on the market, or a sector or security within the market. A user can switch between open windows, open and/or close new windows, etc. A user also may make changes to alerts, symbols list, portfolio content, and the like while the simulation is frozen. Generally, therefore, the user may navigate through and manipulate the broad range of contents within the ACSP windows and capabilities to identify relationships that otherwise would not be discovered because the market information was updating and changing too fast for the user to recognize those relationships. Once the user understands these various interrelationships, a user may employ such understanding in trading in the real time markets.

When the user has finished studying the event, the user may switch back to monitoring the real time data of the primary ACSP. For example, as further described below, the GUI may include icons or tool bar buttons such as to provide a toggle or switch between the real time modes and the simulation modes. Alternatively, the user can switch from one instance of the ACSP to any other open instance of the ACSP using the Windows Taskbar. In one embodiment, the button 86b itself may act as a toggle between the frozen market and non-frozen market information. Note the primary ACSP may continue to run during the freeze action period as well. For example, a user may receive a real time alert while analyzing the frozen market data in the playback ACSP, and the user may then switch back to monitoring the real time data in the manner described above. Upon switching from a simulation to real time, the various data windows would be up-to-date with the current market data so as to reflect real time market conditions.

As seen, for example, in FIG. 13, the freeze action component may be accessed from the market simulator GUI. As part of a given playback of previously recorded data, the recorded market information from that trading day's activities may be stored in memory. At any point during the playback, the freeze action component of the simulator may freeze the market playback at any given instant in time. At such frozen point, the various aspects of the ACSP may be accessed. For example, all of the ACSP's program windows are accessible, and each window would convey its respective data and market information for that instant of time of the freeze. Using the ACSP a user can switch between open windows, open and/or close new windows, etc. Anything that a user can do with the ACSP when it is in real time mode, or in playback mode, can be done at a freeze point. A user may make changes to alerts, symbols list, portfolio content, and the like while the playback is frozen. Generally, there are no limitations to its functionality, and, therefore, the user may navigate through the broad range of contents within the simulation to explore, discover, identify, and consider relationships that, without this invention, would otherwise not be discoverable. Without being able to freeze a market, the market information simply changes too fast for the user to recognize those relationships. Once the user understands these various interrelationships, a user may employ such understanding to trade in real time mode E. Simulation/Real Time Switch The simulation/real-time switch component 58 permits a user to practice on frozen or recorded data without missing real time market events. When the primary ACSP is running and recording in real time mode during normal trading hours, the market simulation capabilities of the FMRS are still fully available. The user may desire to freeze the current session, start a market simulation, or to switch to a market simulation already running. As described in an above example, the user may be alerted to a triggering event that the user may wish to study by entering a simulation and using the freeze action component 56. In such case, both the freeze action simulation mode and the real time mode would need to be operative at the same time without interfering with each other. Similarly, a user may be operating in a simulation mode by replaying previously recorded market data, with the ACSP monitoring real time data in the background. Regardless of the nature of the simulation, real time alerts remain functional within the primary ACSP and may trigger while the user is operating within the simulation.

The following describes two exemplary embodiments for simultaneously running both the real time mode and the simulation modes of the ACSP. In a first exemplary embodiment, two or more instances of the ACSP are simultaneously running on a user's computer—a primary instance of the ACSP, and one or more instances of the secondary ACSP. The secondary ACSP can only playback market recordings. It cannot record real time data. In a second exemplary embodiment, only one instance of the ACSP is running on the user's computer. This single instance of the ACSP is referred to as the primary ACSP. The primary ACSP has full functionality of all aspects of the ACSP. It can both record real time data, and playback market recordings. An explanation of each embodiment follows.

The exemplary embodiments do not allow multiple ACSP's to simultaneously receive real-time data. This limitation is for the practical reduction of bandwidth, and as technology changes may not be relevant. This application considers the possibility of multiple ACSP receiving simultaneous real-time data.

In the first exemplary embodiment, multiple instances of the ACSP run on a user's computer at the same time. During market trading hours, this is the preferred embodiment of the FMRS. The instance of the primary ACSP is both recording and displaying real time data. Simultaneously, one or more secondary, or playback only, instances of the ACSP can be playing back the real time data as it is being recorded. This embodiment has several advantages over the second exemplary embodiment described below, in which the primary instance of the ACSP contains all of the real time display, recording, and freeze components operating within one instance of the ACSP. For example, this embodiment allows a user with a computer system that has two or more physical display monitors to display the real time mode of the primary ACSP on one monitor, and to display simulation-only modes of the secondary ACSP on any of the additional monitors. There are clear advantages for a trader to always have the real time market data visibly available, even when running a market simulation. It allows him or her to have an eye on, and be more responsive to, real time market action. The number of the secondary instances of the ACSP that can be simultaneously running on a user's computer system is limited essentially only by the computer system processor and memory. Even on computer systems with only one display monitor, there are advantages to this embodiment. A user will most often have their ACSP setup differently when looking at a simulation compared to their ACSP setup when monitoring real time data. Additionally, with always having a real time version of the ACSP running when a simulation is also running, there is less likelihood of a trader making the mistake of thinking the simulation is actually the real time version and making real time trading decisions based upon the latent simulation data. There are many other advantages that accrue to a user that is running multiples instances of the ACSP, insofar as the user has more choices available to him or herself compared to fewer choices. A disadvantage of this embodiment is that each instance of the ACSP uses computer resources that might otherwise be available to run other software. However, even modestly powered current day personal computers can easily run three or four instances of an ACSP along with a reasonable compliment of other types of software. As computer processor speed and memory increase, this becomes even less of a disadvantage.

In the second exemplary embodiment, the primary ACSP simultaneously monitors, displays, and records real time market data. The display of the data can be switched back and forth between real time mode and simulation mode. In simulation mode, all of the features of the simulator described elsewhere in this application are available to the user. An advantage of this embodiment is that it requires fewer computer resources, and can run on older computers. The function of the simulation/real-time switch 58 is to permit a user to switch between the simulation mode, and the real time mode, as desired under the circumstances. If only an instance of the primary ACSP is running, it switches between modes. If multiple instances of the ACSP are running it toggles sequentially through them eventually coming back to the instance from which they started. Alternatively, in the first exemplary embodiment described above, if a simulation mode of the ACSP is not already open, clicking on the toggle would both start a simulation mode, and then switch the user to the instance of the ACSP running it. Also, as described above, the user can switch from one instance of the ACSP, to any other open instance of the ACSP using the Windows Taskbar.

For example, the following sequence may occur: a user may receive a real time alert, then enter a simulation mode, and via using the freeze action component, take the opportunity to study the event that triggered the alert. If another real time alert is generated, the user may exit the simulation and return to the real time mode to view a second alert, at which time the previous simulation may freeze in time. The user may then reenter the previous simulation to further study the first alert from the frozen point. In other words, when a user is in the real time mode, a simulation can remain paused so that when the user reenters the simulation, the user may progress from the point where the user left off.

As seen in FIGS. 10-13, the GUIs of the various ACSP and FMRS components may provide a dedicated toolbar button or icon 86c for switching between real time and simulation modes. Clicking the simulation/real-time switch icon 86c may execute the toggle features described above that switches the desktop view state between simulation mode(s) and real time mode, and vice versa. Note that in the simulation mode, the real-time data with all of its information windows, continues to run in the background, and the real-time functions remain active but not visible to the user. In one embodiment, the layout of the user's desktop does not change when the mode is switched. The same charts, times and sales tables, windows, etc. remain open and simply may be repopulated with the data associated to the active mode. The user may switch between the simulation mode and real time mode as often as the user desires.

Similarly, alerts in each mode may be active simultaneously. In real time mode, typically only real-time alerts are displayed. In the simulation mode, however, both real time and simulation alerts are displayed because a user still would want to receive real time alerts during a simulation. Various audiovisual parameters (color, sound tone, etc.) may be employed to distinguish between simulation alerts and real time alerts when the program is in the simulation mode.

F. Learn/Teach Switch Component

The learn/teach switch component 59 permits a user to record, playback, and edit user metadata. As described above, user metadata consists of specific time sequential information that tracks user inputs and interactions with the ACSP, and other communication and browsing software. The metadata may include time stamped layers of notes, voice narration, mouse movements, and other metadata such as, but not limited to, images, emails, instant message conversations, web browsing history, etc.

The recording of such user metadata may be useful to a trader in different ways. For example, it may be used as a teaching tool. An expert trader can put the market replicator in learning mode, and record all of their user inputs as they interact with the market through the ACSP. It will record everything they do as they analyze the market data, react to information, execute trades, interact with colleagues, and so on. The expert can also include voice recordings made while using the ACSP. These recordings can be accurately played back during a simulation even though the simulation is frozen, or played back at some speed either faster or slower than normal. During the playback of a simulation, a student can put the simulator in teaching mode, and in addition to playing back all of the real time market data that was recorded, it will playback all of the expert's interactions with the ACSP. In this way, a student in the art of trading, can replicate and learn from an expert trader. This is how users can learn from other traders' workflow and style.

The learn/teach component can also be used as a learning tool. As another example, a user can take similar actions as described above for the expert, except that they would record their own metadata. During playback, in the teaching mode, the user can thoroughly analyze all of their previous actions, try to analyze what actions they took that were right, which ones were wrong, and what they could do to improve their results.

The exemplary GUI's of FIGS. 10-13 include a dedicated button input 86e to execute the learn/teach component 59. Although the precise method of accessing the learn/teach component may be varied, the figures demonstrate that the learn/teach component may be launched from a variety operational points within the ACSP and/or FMRS.

The user may execute the learn/teach component using a toolbar button or action item 86e in the ACSP GUI or toolbar. Although the learn/teach component may be accessed by other means (e.g., a dropdown menu, menu tree, or other selection means), an iconic system has advantages because an icon button may be accessed quickly and may act as a toggle between putting the market replicator or market simulator in learning mode or teaching mode.

Learning mode is available either when the market replicator is recording market data, or when the market simulator is in playback mode. Teaching mode is only available when the market simulator is in playback mode.

Referring to FIG. 12, the learn/teach button 86e is activated only when a market replication is being recorded. During a recording, pressing the learn/teach button 86e would toggle between turning on the learning mode, and turning it off. Stopping the recording mode of the market replicator would automatically turn off the learning mode.

Referring to FIG. 13, the learn/teach button 86e is active only when a market replication is being played back by the market simulator. During the simulation, the user has either the learning or teaching modes available to be turned on or off. The user can determine which of these modes would be toggled on and off, by choosing a default setting from a menu item made available by pressing the CMD button 89a. If the learning mode is set as the default, pressing the learn/teach button 86e would toggle between turning on the learning mode, and turning it off. Likewise, if the teaching mode is set as the default, pressing the learn/teach button 86e would toggle between turning on the teaching mode, and turning it off. Ending a market simulation would automatically turn off whichever mode might be active. Other options pertaining to the Learn/Teach Switch Component 59 would also be made available to the user by pressing the CMD button 89a.

The learning mode can be activated at any time during the making or playback of a market recording. Learning mode doesn't have to be turned on for the entire time of a recording or playback. Learning mode can be started and stopped multiple times during a recording.

If the user chooses the learning mode when running the market simulator, pressing the learn/teach button 86e would start a fresh recording of user metadata starting at that market time. Any previously recorded user metadata for that market time period would be completely replaced and overwritten.

If the user chooses the teaching mode when running the market simulator, pressing the learn/teach button 86e would start the playback of a previously recorded learning session. If there was not a previously recorded learning session made for the current market time of the simulation, no user metadata would display. When the simulation advances to a market time for which metadata had been previously recorded, the information would automatically be displayed. Also, when in teaching mode, the user may insert new user metadata during a simulation. The user may select options from the CMD button 89a menu that allows such insertions during simulation playback. Other options available to the user may include, but are not limited to, editing functions, filtering of which metadata is to be displayed such as notes, voice narration, mouse movements, images, emails, instant message conversations, web browsing history, etc.

When any of the above methods are used to turn off the learning mode, the user would be prompted as to whether or not they want to save the user metadata. If the user did want to save the metadata, it would be added to the existing market recording metadata blocks. Any previously saved user metadata blocks would be overwritten.

In an exemplary embodiment, referring to FIG. 13, the user metadata information can be displayed in any one or more of the information windows FIGS. 92b-92e. During simulator playback, whether in the learning mode or the teaching mode, a user can edit the previously recorded user metadata. The user can add, change or delete any previously recorded user metadata. As described above, various editing options are available to the user through menus. Also, the user would be prompted to save any editing. User metadata can be displayed and edited in other ways.

G. Market Data Manager Component

The market data manager component 60 manages the large amounts of data associated with the FMRS. Saving sufficient data to simulate financial market activity requires large data files that may challenge data storage systems of personal computing devices (e.g., laptop and desktop computers). The data manager 60 provides for separate data management of data on network servers and/or on user terminals or computers. Referring again to FIG. 3, for example, a plurality of user terminals or computers 72 may operate as part of a network 70. Each user terminal or computer may have its own storage medium (e.g., memory 16 of FIG. 2). The network 70 may also include one or more network storage devices 78 for storing data on the network external to the user devices 72.

In one embodiment, the market data manager may cause the broad-based information for markets and exchanges to be stored in network server databases. Typically, such storage is performed at the data feed level. Market data may be separately recorded and saved in files delineated by data feed subscription. Data may be saved in a variety of other ways as well. As other examples, FMRS files can be initially recorded and saved in separate files for each exchange or for predetermined groups of exchanges, for each type of financial instrument (stocks, bonds, commodities, etc.) and/or other data categories.

Once the financial market data is stored in one of these initial files at the data feed level, the market replicator may combine and intermix the various data as described above to create new files containing blended data across multiple vendors, exchanges or exchange groups, financial instruments, data feeds, and/or combinations thereof. It will be appreciated that the potential combinations of types of financial instruments, vendors, exchanges and the like are vast. Libraries of historical data may also be stored for future reference or resale. Once the combined files have been generated, the market data manager 60 may be employed to direct the files to an appropriate storage location. At this level of data storage, the data amount is intended to be sufficient, as stated above, to simulate a financial market in a manner that would be difficult to differentiate from the real time market.

New data files created from the intermixing of existing data files would be created in such a manner as to maintain the time order of the data, even though the data might come from one or more financial exchanges. As can be seen, the FMRS can combine previously made recordings, each containing financial information from the same moments in time, and from different financial markets, into a mega data stream that spans multiple markets and multiple exchanges. Separate files may be maintained for each for each type of data, run simultaneously and intermixed into a single data stream.

Although the same data management techniques used for storage on network servers can be employed on user computers and user storage devices, since data storage requirements are very high, the amount of stored data may provide limitations as to what files would typically be stored on user devices. For example, a typical file of just US Stocks combining data only from the NYSE, AMEX and NASDAQ stock exchanges, even when utilizing data compression techniques, can contain over two hundred million separate messages, and use over 4 gigabytes of storage space for a 6.5 hour trading session. One can readily see that a comprehensive data base representing the world markets could consume terabytes of storage space annually.

As a practical matter, in contrast to network servers, user devices would tend to lack the storage capacity for saving the totality of the financial market data. The saved FMRS files on user equipment, therefore, would tend to be more focused based on the user's specific circumstances. The market data manager may convert or parse the broad market data stored on the servers into more focused, user-oriented data files that would be suitable for storage on a user device.

For example, the data stored on a user's computer may be limited based on the user's entitlement to only specific data, such as a subscribed data stream or streams from one or more particular vendors. In one embodiment, the user may receive only data for a predetermined list of stocks and/or other financial instruments of the user's choosing. For example, if a given stock is not on the user's symbol list, then the user would not receive market information for such stock, and the recording would not include that stock. Data stored on user devices may also be limited to particular portions of a trading day or based on storing data at particular increments of times. Data may also limited based on financial data type, such as limiting the data to only Level I and/or Level II data, limiting the data to only certain types of news events, and so on. A separate data file also may be devoted to each simulation. It will be appreciated that data limitations or delineations for storing data on user devices may be defined in a myriad of ways, which then may be inputted to and applied by the market data manager to generate more user-oriented data files.

Figure 14:
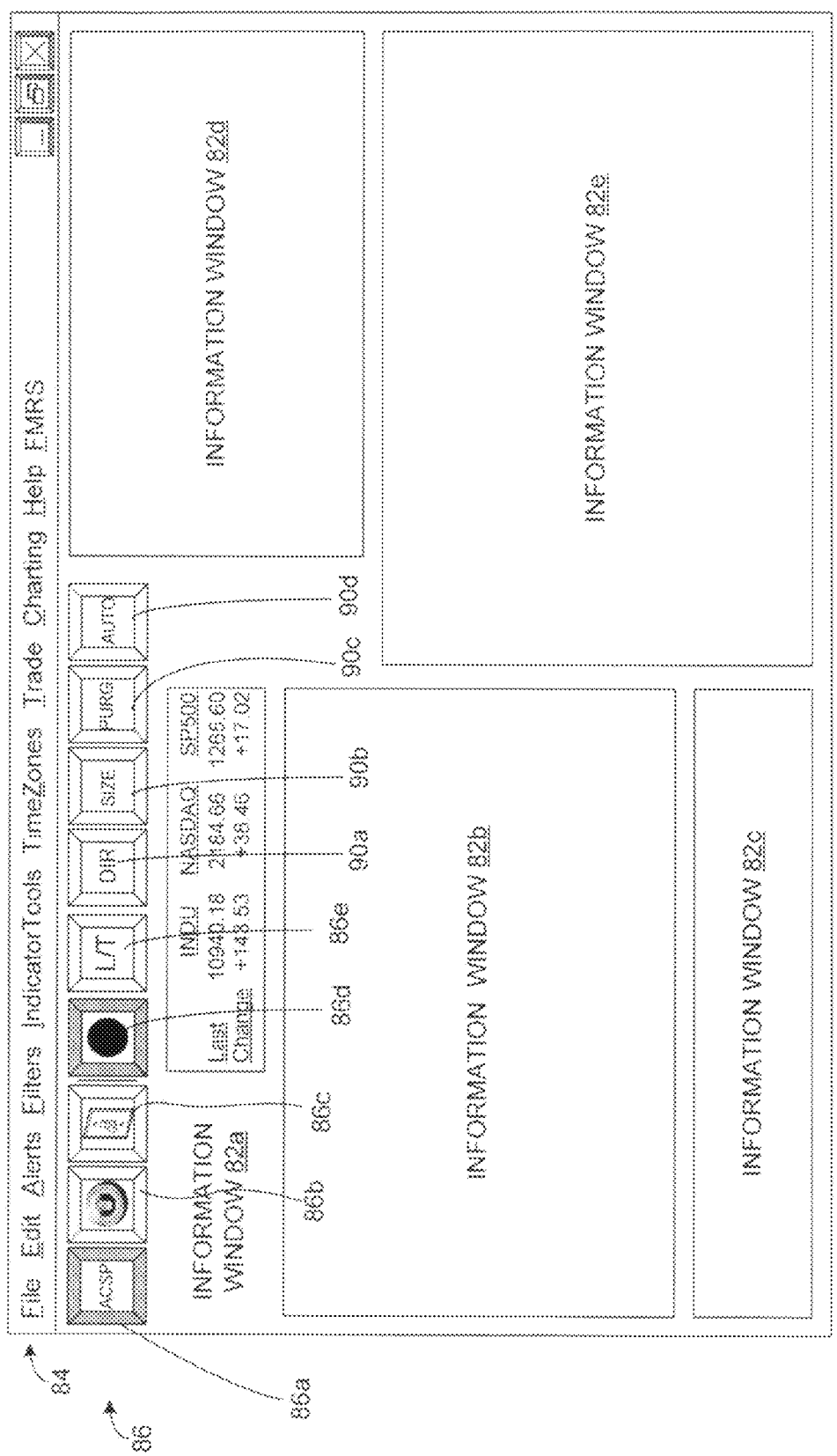
FIG. 14 is a schematic diagram of an exemplary GUI for a market data manager component of the FMRS.

Referring again to FIG. 11, the exemplary FMRS GUI may include a toolbar button or icon 90 for opening the options of the market data manager 60. A more specific GUI for the market data manager may then be employed. FIG. 14 depicts an exemplary GUI for the market data manager, which may be used for file manipulation whether the files are to be stored on a server or a user device. As with the other GUIs described herein, the market data manager GUI of FIG. 14 is an example and may be varied in form and content.

The market data manager GUI may include an icon or tool bar button 90a (DIR) for generating and maintaining a system of directories for storing the various FMRS files. For example, the DIR command may be employed to access submenus or options such as: designate particular storage drives and/or and storage directories; create data folders, file names, and pathways; delete, move, copy, or transmit data files; prioritize or otherwise mark data files by significance, and relatedly lock important files to prevent deletion, editing, transfer of files, etc. A user may also define various security parameters to restrict access to data files. It will be appreciated that any other operations that would be desirable or are employed in large-scale data management operations may be employed by the market data manager.

The exemplary GUI of FIG. 14 also includes a toolbar button or icon 90b (SIZE) by which a user may define various size parameters or size limitations for FMRS files. The SIZE commands may be employed to access submenus or options to define various parameters and restrictions relating to file size. A user may limit file sizes for particular files and/or limit the storage capacity allocated to the FMRS as a whole. Related alerts may be generated to notify a user when individual or overall file size is approaching some restrictive threshold or maximum. In this vein, the market data manager may include an update feature to supplement or intermix recorded data with other historical information. A user at a given time may have recorded or been able to record only certain FMRS data on the user's own computer system. Subsequently, the user may need information that had not been recorded previously, for example, on a day when the user was not running the FMRS on his or her computer. When circumstances permit, a user may update or supplement the recorded data with historical information that had not been recorded, regardless of the reason for the initial deficiency. For example, historical information may pertain to different content, such as different symbol sets, that the user has deemed important subsequent to the initial recording. As another example, a user may have recorded limited information due to a current storage restriction or lack of capacity. The user may then supplement the initial data recording at a later time when storage issues have been obviated.

The exemplary GUI of FIG. 14 also includes a toolbar button or icon 90c (PURG) by which a user may select various purging options. The PURG command may be employed to access submenus or options that allow the user to remove data files to free up storage. Such purging operations may include, for example: purging files older than a particular date; displaying manual selection options to purge files; purging based on security symbol(s); purging based on exchange, vendor, news sources, etc., and others as the user may desire.

The exemplary GUI of FIG. 14 also includes a toolbar button or icon 90d (AUTO) by which a user may set automatic storage and/or purging operations. The AUTO command may be employed to access submenus or options that allow the user to set such automatic storage and/or purging operations based on any of the above parameters. The AUTO feature permits a user to define storage and purging operations once, to be applied automatically when a user begins recording financial market data. In one embodiment, as a recording approaches some file size limitation, an automatic purging operation may go into effect to purge unwanted data as defined by the purge parameters to increase the storage capacity to accommodate the current recording.

For all of the examples cited above in this application, in addition to, or in replacement of, all of the functions available from the toolbar icons, these functions can also be made available through drop down menu selections, short-cut keys, voice commands, or by any other conventional means of inputting commands into a computer system.

III. Conclusion

The above features provide a system and methods for a trader to successfully replicate, simulate, and/or teach another trader to analyze a financial market. In particular, the trader may record, replay and/or reproduce financial market data to generate a simulated market which would be difficult to differentiate from the corresponding real time market. Once in a simulation mode, the user may input and test various trading strategies for efficacy. To do so, a user may play a simulation at real time speed or speeds other than real time depending upon whether a user seeks to study the market data (slow speeds), or provide an expedited or more challenging trading environment. A user also may freeze real time or simulated market data to study the market action at and around the freeze point. The user also may readily switch between one or more market simulations, and a real time mode. User settings and user metadata are also saved enabling a user to replicate a previous user experience within a simulation. The FMSR, therefore, affords a trader the opportunity to generate, study, and test trading strategies that may be applied to real time trading in the market.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method for replicating activity occurring in connection with at least one financial market comprising:
   receiving a market data stream with an electronic receiver over a network interface containing a set of symbols that are traded over the at least one financial market, wherein:
   the symbol set includes a plurality of symbols as to which a user of the system receives financial market data as the financial market data becomes available; and
   the market data stream includes market activity data items for the symbols in the symbol set;
   analyzing each data item within the data stream and maintaining a time order of time values associated with each data item so that the time order of the data items replicates a time order of market events represented by the data items with respect to that at least one financial market;
   encoding the data items of the market data stream into a plurality of data blocks that each comprises functionally integrated sets of information pertaining to market data for the symbol set at any point in time of the market data stream and for defining parameters for the playback of the market data; and
   recording all of the encoded data blocks onto a computer readable medium so that the recorded data blocks, when played back, represent a playback of the entirety of the market data pertaining to the symbol set.

2. The method of claim 1, wherein the received market data stream comprises market activity data items for symbols received from plural sources, and the analyzing and maintaining steps include:
   analyzing each data item within the data stream and intermixing data items from the plural sources so as to maintain the time order of time values associated with each data item so that the time order of the data items replicates a time order of market events represented by the data items, and recording the market data stream as intermixed.

3. The method of claim 1, wherein the received market activity data items include at least Level I market activity data items for the symbols in the symbol set.

4. The method of claim 1, wherein the received market activity data items include at least Level II market activity data items for the symbols in the symbol set.

5. The method of claim 1, wherein the received market activity data items include at least news market activity data items for the symbols in the symbol set.

6. The method of claim 1, wherein the symbol set contains symbols for substantially all symbols traded over one or more financial markets and the recorded data, when played back, represents substantially the entirety of the activity occurring in connection with the one or more financial markets.

7. The method of claim 1, wherein the symbols are fewer symbols than substantially all symbols traded over one or more financial markets and the recorded data, when played back, represents a playback of the entirety of the market data as to the symbols.

8. The method of claim 1, wherein the data blocks comprise at least Level I market activity data items for the symbol set at a known point in time and incremental changes to the data items from the known point in time to a subsequent point in time.

9. The method of claim 1, wherein the data blocks comprise at least Level II market activity data items for the symbol set at a known point in time and incremental changes to the data items from the known point in time to a subsequent point in time.

10. The method of claim 1, wherein when the recorded data stream is played back, the playback is substantially indistinguishable from a live market data stream for the market time period corresponding to the recorded market data stream.

11. The method of claim 10, wherein the market is the sum of all the activity and information pertaining to the symbol set.

12. The method of claim 1, wherein the data blocks include at least one initialization block, the initialization block designating a boundary for a component of the recorded market data stream from which the playback of the market data may be initiated, and including initial statistics and analytics for the recorded symbol set.

13. The method according to claim 12, wherein the data blocks further comprise at least one of market waypoint blocks, market streaming blocks, cache blocks, user waypoint blocks, freeze point blocks, alert blocks, user settings blocks, replay information blocks, or user metadata blocks.

14. The method of claim 12, wherein the initialization block further contains information pertaining to the structure of the recording including references for accessing and decoding information contained in other of the plurality of data blocks.

15. The method of claim 1, wherein the data blocks include at least one waypoint block, the waypoint block comprising a data snapshot of the entirety of the market data for the symbol set such that the data snapshot contains all of the symbols in the market data stream and represents the current state of the market for each symbol in the market data stream from a start of the recording to a particular point in time in the recording of the snapshot.

16. The method of claim 15, wherein when the recorded data stream is played back, the playback at least one of starts at a waypoint block, ends at a waypoint block, or plays between two waypoint blocks.

17. The method of claim 15, wherein when the recorded data stream is played back, the playback starts at the point of a waypoint block in the market data stream and plays back in a manner that is indistinguishable from a playback that starts prior to the point of the waypoint block in the market data stream.

18. The method claim 15, wherein a plurality of waypoint blocks are recorded automatically at a periodic interval.

19. The method of claim 15, wherein the at least one waypoint block includes statistics and analytics pertaining to the symbol set at the particular point within the market data stream of the waypoint block, based on recorded market data that precedes the particular point within the market data stream of the waypoint block.

20. The method of claim 15, wherein a first waypoint block includes a reference to a second waypoint block at a different point within the market data stream.

21. The method of claim 20, wherein during the playback of the market data stream the playback jumps from the point of the first waypoint block to the point of the second waypoint block.

22. The method of claim 15, wherein the data blocks further comprise an initialization block containing references to locations of waypoint blocks at different points within the market data stream.

23. The method claim 15, wherein the at least one waypoint block is recorded at a user defined point within the market data stream.

24. The method claim 15, wherein the at least one waypoint block is automatically recorded at a point triggered by an analytics and charting software program.

25. The method according to claim 15, wherein the data blocks further comprise at least one of initialization blocks, market streaming blocks, cache blocks, freeze point blocks, alert blocks, user settings blocks, replay information blocks, or user metadata blocks.

26. The method of claim 15, wherein the received market data stream comprises market activity data items for symbols received from plural sources, and the analyzing and maintaining steps include:
analyzing each data item within the data stream and intermixing data items from the plural sources so as to maintain the time order of time values associated with each data item so that the time order of the data items replicates a time order of market events represented by the data items, and recording the market data stream as intermixed.

27. The method of claim 1, wherein the data blocks include at least one streaming block, the method further comprising forming a steaming block by, for each symbol, calculating a time-ordered difference between each successive price change value, volume change value and time change value;
encoding a streaming data block that contains at least one of the time-ordered differences for each symbol in the data stream, or actual successive time ordered values for prices, volumes and times;
and recording the streaming data block onto a computer readable medium so that when the recorded streaming data block is played back, the change values are progressively applied and played during a simulation to replicate trading activity of the entirety of the market data pertaining to the symbol set.

28. The method of claim 27, wherein the received market data stream comprises market activity data items for symbols received from plural sources, and the analyzing and maintaining steps include:
analyzing each data item within the data stream and intermixing data items from the plural sources so as to maintain the time order of time values associated with each data item so that the time order of the data items replicates a time order of market events represented by the data items, and recording the market data stream as intermixed.

29. The method claim 27, wherein a plurality of streaming data blocks are recorded automatically at a periodic interval.

30. The method of claim 27, wherein the streaming data block includes statistics and analytics pertaining to the symbol set at the particular point within the market data stream of the streaming block, based on recorded market data that precedes the particular point within the market data stream of the streaming data block.

31. The method of claim 27, wherein the data blocks further comprise an initialization block containing references to locations of streaming data blocks at different points within the market data stream.

32. The method claim 27, wherein the streaming data block is recorded at a user defined point within the market data stream.

33. The method of claim 1, wherein different types of data blocks are recorded in separate files.

34. The method of claim 1, wherein different types of data blocks are recorded in combination together into one file.

35. The method of claim 1, wherein the market data stream is received from a data source comprising a computer readable medium storing a recording of all of the time-ordered data items from the market data stream so that the recorded data, when played back, represents a playback of the entirety of the market data pertaining to the symbol set.

36. A method for replicating activity occurring in connection with at least one financial market comprising:
  receiving a recording of a market data stream with an electronic receiver from a data source containing a set of symbols that are traded over the at least one financial market, wherein:
    the symbol set includes a plurality of symbols as to which a user of the system receives financial market data as the financial market data becomes available; and
    the market data stream includes market activity data items for the symbols in the symbol set;
  analyzing each data item within the data stream and maintaining a time order of time values associated with each data item so that the time order of the data items replicates a time order of market events represented by the data items with respect to that at least one financial market; and
  playing back the time-ordered data items from the market data stream through a financial market analytics and charting user interface so that the playback represents the entirety of the market data pertaining to the symbol set,
  wherein during playback, the financial market analytics and charting user interface remains functional to receive user inputs to navigate and manipulate the recorded market data, the method further comprising receiving a user input to the financial market analytics and charting user interface to navigate or manipulate the recorded market data.

37. The method of claim 36, wherein the received market activity data items include at least Level I market activity data items for the symbols in the symbol set.

38. The method of claim 36, wherein the received market activity data items include at least Level II market activity data items for the symbols in the symbol set.

39. The method of claim 36, wherein the received market activity data items include at least news market activity data items for the symbols in the symbol set.

40. The method of claim 36, wherein the market data stream is received from a data source comprising a market data stream received over a network interface in real time, and the playback occurs simultaneously with the receiving and recording of the data.

41. The method of claim 40, further comprising freezing the playback of the time-ordered data items from the market data stream.

42. The method of claim 41, wherein the financial market analytics and charting user interface remains functional at the point in the market data stream at which the playback of the market data stream is frozen.

43. The method of claim 42, wherein the method further comprises receiving a user input to the financial market analytics and charting user interface to navigate or manipulate the recorded market data at the point in the market data stream at which the playback is frozen.

44. The method of claim 41, further comprising, while the playback is frozen, recording all of the time-ordered data items from the market data stream onto a computer readable medium so that the recorded data, when played back, represents a playback of the entirety of the market data pertaining to the symbol set.

45. The method of claim 36, further comprising recording all of the time-ordered data items from the market data stream onto a computer readable medium so that the recorded data, when played back, represents a playback of the entirety of the market data pertaining to the symbol set.

46. The method of claim 45, further comprising switching between a real-time mode in which the financial market analytics and charting user interface displays data in accordance with live market events, and a playback mode in which the financial market analytics and charting user interface displays the playback of the recorded data.

47. The method of claim 36, wherein the market data stream is received from a data source comprising a computer readable medium storing a recording of all of the time-ordered data items from the market data stream so that the recorded data, when played back, represents a playback of the entirety of the market data pertaining to the symbol set.

48. The method of claim 47, further comprising controlling the playback in accordance with a user input, including at least one of freezing the playback, rewinding the playback, fast-forwarding the playback, jumping to a point of the playback, or altering a speed of the playback to speed up or slow down the playback.

49. The method of claim 47, wherein the recorded data stream includes at least one waypoint to mark the recorded data stream at a corresponding market time, and the playback at least one of starts at a waypoint, ends at a waypoint, or plays between two waypoints.

50. The method of claim 47, wherein the recorded data stream includes at least one waypoint to mark the recorded data stream at a corresponding market time, and the playback starts at the waypoint and plays back in a manner that is indistinguishable from a playback that starts prior to the waypoint.

51. The method of claim 36, wherein the user input to the financial market analytics and charting user interface is a trade associated with a symbol selected from the set of symbols, and the method further comprises simulating the execution of the trade.

52. The method of claim 36, wherein the user input to the financial market analytics and charting user interface is criteria for triggering an alert, and the method further comprises generating an alert indicator when the data in the recorded market data stream satisfies the criteria of the alert.

53. The method of claim 36, wherein the user input to the financial market analytics and charting user interface is criteria for triggering an alert, and the method further comprises generating an alert indicator when live market data being received by the financial market analytics and charting user interface satisfies the criteria of the alert.

54. The method of claim 36, wherein the user input to the financial market analytics and charting user interface is a user note pertaining to a data item in the market data stream, and the method further comprises incorporating the note into the market data stream.

55. The method of claim 54, wherein the user note is at least one of a text note, audio recording, video recording, metadata, or still image.

56. The method of claim 36, further comprising recording results of the user input so that when the recorded market data stream is played back, the playback includes the results of the user input.

57. The method of claim 36, further comprising altering a speed of the playback to speed up, slow down, or freeze the playback.

58. The method of claim 57, further comprising time-synchronizing the user input to the financial market analytics and charting user interface in accordance with the altered playback speed so that the user input is matched to the corresponding market time in the market data stream.

59. The method of claim 58, wherein, when the playback is frozen, the user input to the financial market analytics and charting user interface is time-synchronized to correspond to the market time in the market data stream at which the playback is frozen.

60. The method of claim 57, wherein the user input is a trade associated with a symbol selected from the set of symbols, and the method further comprises simulating the execution of the trade.

61. The method of claim 57, wherein the user input to the financial market analytics and charting user interface is criteria for triggering an alert, and the method further comprises generating an alert indicator when the data in the recorded market data stream satisfies the criteria of the alert.

62. The method of claim 36, wherein the playback is substantially indistinguishable from a live market data stream for the market time period corresponding to the recorded market data stream.

63. The method of claim 62, wherein the market is the sum of all the activity and information pertaining to the symbol set.

64. The method of claim 36, wherein playing back the data items of the market data stream comprises decoding the market data from at least one of a plurality of recorded data blocks that each comprises functionally integrated sets of information pertaining to market data items for the symbol set at any point in time of the market data stream and for defining parameters for the playback of the market data items.

65. The method of claim 64, wherein the data blocks comprise at least one of initialization blocks, market waypoint t blocks, market streaming blocks, cache blocks, user waypoint blocks, freeze point blocks, alert blocks, user settings blocks, replay information blocks, and user metadata blocks.

66. The method of claim 64, wherein the data blocks comprise at least the Level I market activity data items for the symbol set at a known point in time and incremental changes to the data items from the known point in time to a subsequent point in time.

67. The method of claim 64, wherein the data blocks comprise at least the Level II market activity data items for the symbol set at a known point in time and incremental changes to the data items from the known point in time to a subsequent point in time.

68. The method of claim 64, wherein the data blocks comprise at least the news market activity data items for the symbol set at a known point in time and incremental changes to the data items from the known point in time to a subsequent point in time.

69. The method of claim 64, wherein the data blocks include at least one initialization block, the initialization block designating a boundary for a component of the recorded market data stream from which the playback of the market data may be initiated and including initial statistics and analytics for the symbol set, and the method further comprises initiating the playback of the market data items by decoding an initializing block.

70. The method of claim 69, wherein the initialization block further contains information pertaining to the structure of the recording including references for accessing information contained in other of the plurality of data blocks.

71. The method of claim 64, wherein the data blocks include at least one waypoint block, the waypoint block comprising a data snapshot of the entirety of the market data for the symbol set such that the data snapshot contains all of the symbols in the market data stream and represents the current state of the market for each symbol in the market data stream from a start of the recording to a particular point in time in the recording of the snapshot; and the method further comprises initiating the playback of the data items of the market data stream by decoding a waypoint block.

72. The method of claim 71, wherein a waypoint block includes statistics and analytics pertaining to the symbol set at the particular point within the market data stream of the waypoint block, based on recorded market data that precedes the particular point within the market data stream of the waypoint block.

73. The method of claim 71, wherein a first waypoint block includes a reference to a second waypoint block at a different point within the market data stream; and the method further comprises, during the playback of the data items of the market data stream, jumping from the point of the first waypoint block to the point of the second waypoint block.

74. The method of claim 71, wherein the data blocks further comprise an initialization block containing references to locations of waypoint blocks at different points within the market data stream.

75. The method of claim 64, further comprising for each symbol in the data base, calculating a time-ordered difference between each successive price change value, volume change value and time change value, wherein the data blocks include a streaming data block that contains the time-ordered differences for each symbol in the data stream; and playing back the streaming data block so that the change values are progressively played during a simulation to replicate trading activity of the entirety of the market data pertaining to the symbol set.

76. The method of claim 75, wherein the streaming data block includes statistics and analytics pertaining to the symbol set at the particular point within the market data stream of the streaming block, based on recorded market data that precedes the particular point within the market data stream of the streaming data block.

77. The method of claim 75, wherein the data blocks further comprise an initialization block containing references to locations of streaming data blocks at different points within the market data stream.

78. A system for replicating activity occurring in connection with at least one financial market comprising:

an electronic data receiver receiving a market data stream over a network interface containing a set of symbols that are traded over the at least one financial market, wherein:

the symbol set includes a plurality of symbols as to which a user of the system receives financial market data as the financial market data becomes available; and the market data stream includes market activity data items for the symbols in the symbol set;

and an electronic processor configured to:

analyze each data item within the data stream and maintain a time order of time values associated with each data item so that the time order of the data items replicates a time order of market events represented by the data items with respect to that at least one financial market; and encode the data items of the market data stream into a plurality of data blocks that each comprises functionally integrated sets of information pertaining to market data for the symbol set at any point in time of the market data stream and for defining parameters for the playback of the market data; and record all of the encoded data blocks onto a computer readable medium so that the recorded data blocks, when played back, represent a playback of the entirety of the market data pertaining to the predetermined symbol set.

79. The system of claim 78, wherein the received market data stream comprises market activity data items for symbols in the received from plural sources, and the electronic processor is configured to:

analyze the data items and maintain the time order by intermixing data items from the plural sources so as to maintain the time order of time values associated with each data item so that the time order of the data items replicates a time order of market events represented by the data items; and record the market data stream as intermixed.

80. The system of claim 78, wherein the received market activity data items include at least Level I market activity data items for the symbols in the symbol set.

81. The system of claim 78, wherein the received market activity data items include at least Level II market activity data items for the symbols in the symbol set.

82. The system of claim 78, wherein the received market activity data items include at least news market activity data items for the symbols in the symbol set.

83. The system of claim 78, wherein the symbol set contains symbols for substantially all symbols traded over one or more financial markets and the recorded data, when played back, represents substantially the entirety of the activity occurring in connection with the one or more financial markets.

84. The system of claim 78, wherein the symbols are fewer symbols than substantially all symbols traded over one or more financial markets and the recorded data, when played back, represents a playback of the entirety of the market data as to the symbols.

85. The system of claim 78, wherein the data blocks comprise at least Level I market activity data items for the symbol set at a known point in time and incremental changes to the data items from the known point in time to a subsequent point in time.

86. The system of claim 78, wherein the data blocks comprise at least Level II market activity data items for the symbol set at a known point in time and incremental changes to the data items from the known point in time to a subsequent point in time.

87. The system of claim 78, wherein when the recorded data stream is played back, the playback is substantially indistinguishable from a live market data stream for the market time period corresponding to the recorded market data stream.

88. The system of claim 87, wherein the market is the sum of all the activity and information pertaining to the symbol set.

89. The system of claim 78, wherein the data blocks include at least one initialization block, the initialization block designating a boundary for a component of the recorded market data stream from which the playback of the market data may be initiated, and including initial statistics and analytics for the symbol set.

90. The system of claim 89, wherein the data blocks further comprise at least one of market waypoint blocks, market streaming blocks, cache blocks, user waypoint blocks, freeze point blocks, alert blocks, user settings blocks, replay information blocks, or user metadata blocks.

91. The system of claim 89, wherein the initialization block further contains information pertaining to the structure of the recording including references for accessing and decoding information contained in other of the plurality of data blocks.

92. The system of claim 78, wherein the data blocks include at least one waypoint block, the waypoint block comprising a data snapshot of the entirety of the market data for the symbol set such that the data snapshot contains all of the symbols in the market data stream and represents the current state of the market for each symbol in the market data stream from a start of the recording to a particular point in time in the recording of the snapshot.

93. The system of claim 92, wherein when the recorded data stream is played back, the playback at least one of starts at a waypoint block, ends at a waypoint block, or plays between two waypoint blocks.

94. The system of claim 92, wherein when the recorded data stream is played back, the playback starts at the point of a waypoint block in the market data stream and plays back in a manner that is indistinguishable from a playback that starts prior to the point of the waypoint block in the market data stream.

95. The system of claim 92, wherein the electronic processor is configured to record a plurality of waypoint blocks automatically at a periodic interval.

96. The system of claim 92, wherein the at least one waypoint block includes statistics and analytics pertaining to the symbol set at the particular point within the market data stream of the waypoint block, based on recorded market data that precedes the particular point within the market data stream of the waypoint block.

97. The system of claim 92, wherein a first waypoint block includes a reference to a second waypoint block at a different point within the market data stream.

98. The system of claim 97, wherein during the playback of the market data stream the playback jumps from the point of the first waypoint block to the point of the second waypoint block.

99. The system of claim 92, wherein the data blocks further comprise an initialization block containing references to locations of waypoint blocks at different points within the market data stream.

100. The system of claim 92, wherein the electronic processor is configured to record the at least one waypoint block at a user defined point within the market data stream.

101. The system of claim 92, wherein the electronic processor in configured to record the at least one waypoint block automatically at a point triggered by an analytics and charting software program.

102. The system of claim 92, wherein the data blocks further comprise at least one of initialization blocks, market streaming blocks, cache blocks, freeze point blocks, alert blocks, user settings blocks, replay information blocks, or user metadata blocks.

103. The system of claim 92, wherein the received market data stream comprises market activity data items for symbols received from plural sources, and the electronic processor is configured to analyze the data items and maintain the time order by:
analyzing each data item within the data stream and intermixing data items from the plural sources so as to maintain the time order of time values associated with each data item so that the time order of the data items replicates a time order of market events represented by the data items, and recording the market data stream as intermixed.

104. The system of claim 78, wherein for each symbol, the electronic processor is further configured to:
calculate a time-ordered difference between each successive price change value, volume change value and time change value;
encode a streaming data block that contains at least one of the time-ordered differences for each symbol in the data stream, or actual successive time ordered values for prices, volumes and times;
and record the streaming data block onto a computer readable medium so that when the recorded streaming data block is played back, the change values are progressively played during a simulation to replicate trading activity of the entirety of the market data pertaining to the symbol set.

105. The system of claim 104, wherein the received market data stream comprises market activity data items for symbols received from plural sources, and the electronic processor is configured to analyze the data items and maintain the time order by:
analyzing each data item within the data stream and intermixing data items from the plural sources so as to maintain the time order of time values associated with each data item so that the time order of the data items replicates a time order of market events represented by the data items, and recording the market data stream as intermixed.

106. The system claim 104, wherein the electronic processor is configured to record a plurality of streaming data blocks automatically at a periodic interval.

107. The system of claim 104, wherein the streaming data block includes statistics and analytics pertaining to the symbol set at the particular point within the market data stream of the streaming block, based on recorded market data that precedes the particular point within the market data stream of the streaming data block.

108. The system of claim 104, wherein the data blocks further comprise an initialization block containing references to locations of streaming data blocks at different points within the market data stream.

109. The system claim 104, wherein the electronic processor is configured to record the streaming data block at a user defined point within the market data stream.

110. The system of claim 78, wherein the electronic processor is configured to record different types of data blocks in separate files.

111. The system of claim 78, wherein the electronic processor is configured to record different types of data blocks in combination together into one file.

112. The system of claim 78, wherein the market data stream is received from a data source comprising a computer readable medium storing a recording of all of the time-ordered data items from the market data stream so that the recorded data, when played back, represents a playback of the entirety of the market data pertaining to the symbol set.

113. A system for replicating activity occurring in connection with at least one financial market comprising:
an electronic data receiver for receiving a recording of a market data stream from a data source containing a set of symbols that are traded over the at least one financial market, wherein:
the symbol set includes a plurality of symbols as to which a user of the system receives financial market data as the financial market data becomes available; and
the market data stream includes market activity data items for the symbols in the symbol set; and
and electronic processor configured to:
analyze each data item within the data stream and maintain a time order of time values associated with each data item so that the time order of the data items replicates a time order of market events represented by the data items with respect to that at least one financial market; and
play back the time-ordered data items from the market data stream through a financial market analytics and charting user interface so that the playback represents the entirety of the market data pertaining to the symbol set,
wherein during playback, the financial market analytics and charting user interface remains functional to receive user inputs to navigate and manipulate the recorded market data, the electronic processor is further configured to receive a user input to the financial market analytics and charting user interface to navigate or manipulate the recorded market data.

114. The system of claim 113, wherein the received market activity data items include at least Level I market activity data items for the symbols in the symbol set.

115. The system of claim 113, wherein the received market activity data items include at least Level II market activity data items for the symbols in the symbol set.

116. The system of claim 113, wherein the received market activity data items include at least news market activity data items for the symbols in the symbol set.

117. The system of claim 113, wherein the market data stream is received from a data source comprising a market data stream received over a network interface in real time, and the playback occurs simultaneously with the receiving and recording of the data.

118. The system of claim 113, wherein the electronic processor is further configured to freeze the playback of the time-ordered data items from the market data stream.

119. The system of claim 118, wherein the financial market analytics and charting user interface remains functional at the point in the market data stream at which the playback of the market data stream is frozen.

120. The system of claim 97, wherein the electronic processor is further configured to receive a user input to the financial market analytics and charting user interface to navigate or manipulate the recorded market data at the point in the market data stream at which the playback is frozen.

121. The system of claim 118, wherein the electronic processor is further configured to, while the playback is frozen, record all of the time-ordered data items from the market data stream onto a computer readable medium so that the recorded data, when played back, represents a playback of the entirety of the market data pertaining to the symbol set.

122. The system of claim 113, wherein the electronic processor is further configured to record all of the time-ordered data items from the market data stream onto a computer readable medium so that the recorded data, when played back, represents a playback of the entirety of the market data pertaining to the symbol set.

123. The system of claim 122, wherein the electronic data processor is further configured to switch between a real-time mode in which the financial market analytics and charting user interface displays data in accordance with live market events, and a playback mode in which the financial market analytics and charting user interface displays the playback of the recorded data.

124. The system of claim 113, wherein the market data stream is received from a data source comprising a computer readable medium storing a recording of all of the time-ordered data items from the market data stream so that the recorded data, when played back, represents a playback of the entirety of the market data pertaining to the symbol set.

125. The system of claim 124, wherein the electronic processor is further configured to control the playback in accordance with a user input, including at least one of freezing the playback, rewinding the playback, fast-forwarding the playback, jumping to a point of the playback, or altering a speed of the playback to speed up or slow down the playback.

126. The system of claim 124, wherein the recorded data stream includes at least one waypoint to mark the recorded data stream at a corresponding market time, and the playback at least one of starts at a waypoint, ends at a waypoint, or plays between two waypoints.

127. The system of claim 124, wherein the recorded data stream includes at least one waypoint to mark the recorded data stream at a corresponding market time, and the playback starts at the waypoint and plays back in a manner that is indistinguishable from a playback that starts prior to the waypoint.

128. The system of claim 113, wherein the user input to the financial analytics and charting interface is a trade associated with a symbol selected from the set of symbols, and the electronic processor is further configured to simulate the execution of the trade.

129. The system of claim 113, wherein the user input to the financial analytics and charting interface is criteria for triggering an alert, and the electronic processor is further configured to generate an alert indicator when the data in the recorded market data stream satisfies the criteria of the alert.

130. The system of claim 113, wherein the user input to the financial analytics and charting interface is criteria for triggering an alert, and the electronic processor is further configured to generate an alert indicator when live market data being received by the financial market analytics and charting user interface satisfies the criteria of the alert.

131. The system of claim 113, wherein the user input to the financial analytics and charting interface is a user note pertaining to a data item in the market data stream, and the electronic processor is further configured to incorporate the note into the market data stream.

132. The system of claim 131, wherein the user note is at least one of a text note, audio recording, video recording, metadata, or still image.

133. The system of claim 113, wherein the electronic processor is further configured to record results of the user input so that when the recorded market data stream is played back, the playback includes the results of the user input.

134. The system of claim 113, wherein the electronic processor is further configured to alter a speed of the playback to speed up, slow down, or freeze the playback.

135. The system of claim 134, wherein the electronic processor is further configured to time-synchronize the user input to the financial analytics and charting interface in accordance with the altered playback speed so that the user input is matched to the corresponding market time in the market data stream.

136. The system of claim 135, wherein, when the playback is frozen, the user input to the financial analytics and charting interface is time-synchronized to correspond to the market time in the market data stream at which the playback is frozen.

137. The system of claim 134, wherein the user input is a trade associated with a symbol selected from the set of symbols, and the electronic processor is further configured to simulate the execution of the trade.

138. The system of claim 134, wherein the user input to the financial analytics and charting interface is criteria for triggering an alert, and the electronic processor is further configured to generate an alert indicator when the data in the recorded market data stream satisfies the criteria of the alert.

139. The system of claim 113, wherein the playback is substantially indistinguishable from a live market data stream for the market time period corresponding to the recorded market data stream.

140. The system of claim 110, wherein the market is the sum of all the activity and information pertaining to the symbol set.

141. The system of claim 113, wherein the electronic processor is configured to play back the data items of the market data stream by decoding the market data from at least one of a plurality of recorded data blocks that each comprises functionally integrated sets of information pertaining to market data items for the symbol set at any point in time of the market data stream and for defining parameters for the playback of the market data items.

142. The system of claim 141, wherein the data blocks comprise at least one of initialization blocks, market waypoint t blocks, market streaming blocks, cache blocks, user waypoint blocks, freeze point blocks, alert blocks, user settings blocks, replay information blocks, and user metadata blocks.

143. The system of claim 141, wherein the data blocks comprise at least the Level I market activity data items for the symbol set at a known point in time and incremental changes to the data items from the known point in time to a subsequent point in time.

144. The system of claim 141, wherein the data blocks comprise at least the Level II market activity data items for the symbol set at a known point in time and incremental changes to the data items from the known point in time to a subsequent point in time.

145. The system of claim 141, wherein the data blocks comprise at least the news market activity data items for the symbol set at a known point in time and incremental changes to the data items from the known point in time to a subsequent point in time.

146. The system of claim 141, wherein the data blocks include at least one initialization block, the initialization block designating a boundary for a component of the recorded market data stream from which the playback of the market data may be initiated and including initial statistics and analytics for the symbol set, and the electronic processor is configured to initiate the playback of the market data items by decoding an initializing block.

147. The system of claim 146, wherein the initialization block further contains information pertaining to the structure of the recording including references for accessing information contained in other of the plurality of data blocks.

148. The system of claim 141, wherein the data blocks include at least one waypoint block, the waypoint block comprising a data snapshot of the entirety of the market data for the symbol set such that the data snapshot contains all of the symbols in the market data stream and represents the current state of the market for each symbol in the market data stream from a start of the recording to a particular point in time in the recording of the snapshot; and the electronic processor is configured to initiate the playback of the data items of the market data stream by decoding a waypoint block.

149. The system of claim 148, wherein a waypoint block includes statistics and analytics pertaining to the symbol set at the particular point within the market data stream of the waypoint block, based on recorded market data that precedes the particular point within the market data stream of the waypoint block.

150. The system of claim 148, wherein a first waypoint block includes a reference to a second waypoint block at a different point within the market data stream; and the electronic processor is configured to play back the data items of the market data stream by jumping from the point of the first waypoint block to the point of the second waypoint block.

151. The system of claim 148, wherein the data blocks further comprise an initialization block containing references to locations of waypoint blocks at different points within the market data stream.

152. The system of claim 141, wherein for each symbol in the data base, there is calculated a time-ordered difference between each successive price change value, volume change value and time change value, and the data blocks include a streaming data block that contains the time-ordered differences for each symbol in the data stream; and the electronic processor is configured to play back the streaming data block so that the change values are progressively played during a simulation to replicate trading activity of the entirety of the market data pertaining to the symbol set.

153. The system of claim 152, wherein the streaming data block includes statistics and analytics pertaining to the symbol set at the particular point within the market data stream of the streaming block, based on recorded market data that precedes the particular point within the market data stream of the streaming data block.

154. The system of claim 153, wherein the data blocks further comprise an initialization block containing references to locations of streaming data blocks at different points within the market data stream.

* * * * *